US010652696B2

(12) United States Patent
Ali et al.

(10) Patent No.: US 10,652,696 B2
(45) Date of Patent: May 12, 2020

(54) METHOD AND APPARATUS FOR CATEGORIZING DEVICE USE CASE FOR ON FOOT MOTION USING MOTION SENSOR DATA

(71) Applicant: Trusted Positioning, Inc., Calgary (CA)

(72) Inventors: Abdelrahman Ali, Calgary (CA); Amr Al-Hamad, Calgary (CA); Jacques Georgy, Calgary (CA); Hsiu-Wen Chang, San Jose, CA (US)

(73) Assignee: Trusted Positioning, Inc., Calgary (CA)

( * ) Notice: Subject to any disclaimer, the term of this patent is extended or adjusted under 35 U.S.C. 154(b) by 842 days.

(21) Appl. No.: 14/812,949

(22) Filed: Jul. 29, 2015

(65) Prior Publication Data
US 2016/0034817 A1 Feb. 4, 2016

Related U.S. Application Data
(60) Provisional application No. 62/031,040, filed on Jul. 30, 2014.

(51) Int. Cl.
H04W 4/02 (2018.01)
H04M 1/725 (2006.01)
G06K 9/00 (2006.01)

(52) U.S. Cl.
CPC ....... H04W 4/027 (2013.01); H04M 1/72569 (2013.01); H04W 4/026 (2013.01); G06K 9/00342 (2013.01)

(58) Field of Classification Search
None
See application file for complete search history.

(56) References Cited

U.S. PATENT DOCUMENTS 5,583,776 A * 12/1996 Levi ..................... A43B 3/0005
                                                          701/400
10,038,982 B2 * 7/2018 Alles ..................... H04W 4/023
(Continued)

OTHER PUBLICATIONS

Saeedi, S. et al. (2012). Vision-aided context-aware framework for personal navigation services. International Archives of the Photogrammetry, Remote Sensing and Spatial Information Sciences, 39, B4. (Year: 2012).*

(Continued)

Primary Examiner — Kamran Afshar
Assistant Examiner — Benjamin J Buss
(74) Attorney, Agent, or Firm — Bay Area Technology Law Group PC

(57) ABSTRACT

Systems and methods are disclosed for categorizing a device use case for on foot motion with a portable device. Motion sensor data corresponding to motion of the portable device may be obtained, such as from a sensor assembly of the device. The motions sensor data is processed. Further, a use case characteristic may be determined from the processed and/or raw motion sensor data, an effective frequency may be determined from the processed and/or raw motion sensor data and/or an Eigen use case may be determined. The device use case may then be classified using the processed and/or raw motion sensor data and at least one of the use case characteristic, the effective frequency and the Eigen use case.

48 Claims, 32 Drawing Sheets

(56) References Cited

U.S. PATENT DOCUMENTS

| | | | |
|---|---|---|---|
| 2004/0064286 A1* | 4/2004 | Levi | G01C 21/12 702/141 |
| 2005/0210417 A1* | 9/2005 | Marvit | G06F 1/1613 715/863 |
| 2005/0212749 A1* | 9/2005 | Marvit | G06F 1/1613 345/156 |
| 2006/0031786 A1* | 2/2006 | Hillis | G06F 3/04883 715/863 |
| 2006/0177103 A1* | 8/2006 | Hildreth | G06F 1/1626 382/107 |
| 2007/0167801 A1* | 7/2007 | Webler | G06T 19/00 600/459 |
| 2007/0282565 A1* | 12/2007 | Bye | G01C 21/16 702/158 |
| 2008/0255795 A1* | 10/2008 | Shkolnikov | G01C 21/165 702/141 |
| 2009/0003641 A1* | 1/2009 | Van Der Bilt | H04R 1/1041 381/374 |
| 2009/0100384 A1* | 4/2009 | Louch | G06F 1/1626 715/863 |
| 2009/0240461 A1* | 9/2009 | Makino | A61B 5/1123 702/141 |
| 2011/0181505 A1* | 7/2011 | Tseng | G06F 3/0346 345/157 |
| 2011/0310007 A1* | 12/2011 | Margolis | G06F 3/017 345/157 |
| 2012/0136573 A1* | 5/2012 | Janardhanan | G01C 21/165 701/512 |
| 2012/0245839 A1* | 9/2012 | Syed | G01C 25/005 701/408 |
| 2012/0259578 A1* | 10/2012 | Bevilacqua | G06F 1/1694 702/141 |
| 2012/0303271 A1* | 11/2012 | Chowdhary | A61B 5/0022 701/433 |
| 2013/0090881 A1* | 4/2013 | Janardhanan | G01C 22/006 702/104 |
| 2013/0144682 A1* | 6/2013 | Dhara | G06Q 10/04 705/7.29 |
| 2014/0029377 A1* | 1/2014 | Mellier | G01V 1/00 367/13 |
| 2014/0085341 A1* | 3/2014 | Shin | G09G 5/38 345/659 |
| 2014/0278208 A1* | 9/2014 | Donaldson | A61B 5/7264 702/141 |
| 2014/0278219 A1* | 9/2014 | Canavan | A63B 24/0062 702/150 |
| 2015/0119086 A1* | 4/2015 | Mirowski | G01S 5/0252 455/456.6 |
| 2015/0164430 A1* | 6/2015 | Hu | A61B 5/7264 600/595 |
| 2015/0245164 A1* | 8/2015 | Merrill | H04W 4/06 370/329 |
| 2015/0247729 A1* | 9/2015 | Meduna | H04W 4/027 702/150 |
| 2015/0272511 A1* | 10/2015 | Najafi | G16H 40/63 600/301 |
| 2015/0287338 A1* | 10/2015 | Wells | G09B 19/0038 702/19 |
| 2015/0317890 A1* | 11/2015 | Ten Kate | A61B 5/1117 702/141 |
| 2015/0317980 A1* | 11/2015 | Vermeulen | G10L 15/22 704/225 |
| 2015/0345952 A1* | 12/2015 | Chang | G01C 22/002 701/541 |
| 2015/0365806 A1* | 12/2015 | Parviainen | G06F 3/0346 455/457 |
| 2016/0034817 A1* | 2/2016 | Ali | H04M 1/72569 706/46 |
| 2016/0113550 A1* | 4/2016 | Martin | A61B 5/6898 600/595 |
| 2016/0182887 A1* | 6/2016 | Gutierrez | G06T 7/593 348/46 |
| 2016/0205238 A1* | 7/2016 | Abramson | G01C 21/3641 455/456.4 |
| 2016/0216112 A1* | 7/2016 | Georgy | G01S 19/47 |
| 2016/0231109 A1* | 8/2016 | Chang | G01P 13/00 |
| 2016/0305782 A1* | 10/2016 | Al-Hamad | G01C 21/16 |

OTHER PUBLICATIONS

Miluzzo, E., et al. (2010). Pocket, bag, hand, etc.—automatically detecting phone context through discovery. Proc. PhoneSense 2010, 21-25. (Year: 2010).*

Ladetto, Q. (2000, Sep.). On foot navigation: continuous step calibration using both complementary recursive prediction and adaptive Kalman filtering. In Proceedings of ION GPS (vol. 2000, pp. 1735-1740). (Year: 2000).*

Gusenbauer, D. et al. (2010). Self-Contained Indoor Positioning on Off-The-Shelf Mobile Devices. 2010 International Conference on Indoor Positioning and Indoor Navigation (IPIN), Sep. 15-17, 2010, Zurich, Switzerland. IEEE. 9 pages. (Year: 2010).*

Sabatini, A.M. et al. (2005). Assessment of walking features from foot inertial sensing. IEEE Transactions on biomedical engineering, 52(3), 486-494. (Year: 2005).*

Kim, J.W. et al. (2004). A step, stride and heading determination for the pedestrian navigation system. Journal of Global Positioning Systems, vol. 3, No. 1-2: 273-279. (Year: 2004).*

Negara, A.F.P. et al. "Arm's flex when responding call for implicit user authentication in smartphone." Int. J. Secur. Its Appl 6.879 2012): 83. (Year: 2012).*

Song, J. et al. (2010). "User behavior pattern analysis and prediction based on mobile phone sensors." IFIP International Conference on Network and Parallel Computing. Springer, Berlin, Heidelberg, 2010. (Year: 2010).*

Fan, G.C. et al. (2011). "Generic motion gesture detection scheme using only a triaxial accelerometer". 2011 IEEE 15th International Symposium on Consumer Electronics (ISCE). DOI:10.1109/ISCE. 2011.5973803 (Year: 2011).*

Berman, S. et al. (2012). "Sensors for Gesture Recognition Systems". IEEE Transactions on Systems, Man, and Cybernetics, Part C (Applications and Reviews) vol. 42:3, May 2012. DOI:10.1109/ TSMCC.2011.2161077 (Year: 2012).*

Kunze, K. et al. (2008). "Dealing with sensor displacement in motion-based onbody activity recognition systems". UbiComp '08: Proceedings of the 10th international conference on Ubiquitous computing. Sep. 2008. pp. 20-29. DOI:10.1145/1409635.1409639 (Year: 2008).*

* cited by examiner

METHOD AND APPARATUS FOR CATEGORIZING DEVICE USE CASE FOR ON FOOT MOTION USING MOTION SENSOR DATA

CROSS REFERENCE TO RELATED APPLICATIONS

This application claims priority from and benefit of U.S. Provisional Patent Application Ser. No. 62/031,040, filed Jul. 30, 2014, which is entitled "METHOD FOR PORTABLE DEVICE USE-CASE DETERMINATION," which is assigned to the assignee hereof and is incorporated by reference in its entirety.

FIELD OF THE PRESENT DISCLOSURE

This disclosure generally relates to categorizing a device use case for a portable device and more particularly to characterizing a relationship between the portable device and a user who is undergoing on foot motion.

BACKGROUND

Portable electronic devices, such as those configured to be handheld or otherwise associated with a user, are employed in a wide variety of applications and environments. The ubiquity of such devices as mobile phones, wearables, including smart watches and glasses, digital still cameras and video cameras, handheld music and media players, portable video game devices and controllers, tablets, mobile internet devices (MIDs), personal navigation devices (PNDs), other APPlication acCESSORIES (or Appcessories for short) and other similar devices speaks the popularity and desire for these types of devices. Increasingly, such devices are equipped with one or more sensors or other systems for determining the position or motion of the portable device.

Information obtained from such sensors regarding motion of a portable device has been leveraged to provide information about the behavior and physical activity of a user. In turn, this information has been extensively applied in different fields such as navigation and localization, health monitoring, emergency services, athletic training, sport rehabilitation, elderly assistance and others. For example, indoor navigation systems benefit from knowledge about user motion and dynamics. In this context, such information may be used to select an appropriate movement model for a pedestrian, which can be used to limit the possible locations in combination with the other absolute positioning technologies, as well as to establish certain constraints that aid the navigation system. Motion sensors, such as accelerometers, gyroscopes, magnetometers and the like may be used to provide a basic indoor positioning solution for relatively short time periods when starting from a known position. Further, having information about the orientation of the device with respect to the user may increase the accuracy of a navigation solution. However, holding or fixing the device in a certain orientation so that it's orientation with respect to the user is known is unrealistic and inconvenient for the user. Thus, as a practical matter, portable devices including smartphones, tablets, smart watches, and smart glasses, etc. may be constrained or unconstrained in relation to the user such that the orientation of the device with respect to the user is not known.

Accordingly, it would be desirable to classify the current relationship between the device and the user, such as by determining how the device is being used, in order to gain insight into the potential relative orientation between the user and the device. Correspondingly, "device use case" as used herein refers to the type of interaction between a portable device and the user, and may include whether the user is carrying the device, holding the device with a swinging arm, positioning it "on ear" when talking, inputting data or viewing in a navigation or texting operation, carrying the device in a pocket or other container or holder, and other usages of the device that affect its orientation with respect to the user. Knowledge of the device use case may also provide other benefits. For example, a device use case not associated with active user engagement, such as being in a pocket, may allow improved management of operations being performed by the device, including the ability to enter power saving modes to save energy.

As will be described in the following materials, this disclosure satisfies these and other needs.

SUMMARY

As will be described in detail below, this disclosure includes methods for categorizing a device use case for on foot motion with a portable device. In one embodiment, the method may include obtaining motion sensor data corresponding to motion of the portable device, processing the motion sensor data, performing at least one of deriving a use case characteristic from the processed and/or raw motion sensor data, determining an effective frequency from the processed and/or raw motion sensor data and determining an Eigen use case, and then categorizing the device use case of the portable device using the processed and/or raw motion sensor data and at least one of the use case characteristic, the effective frequency and/or the Eigen use case.

This disclosure also includes a portable device for categorizing device use case. In one embodiment, a representative portable device may have a sensor assembly integrated with the portable device that may output data representing motion of the portable device, a processor that may process the motion sensor data and a categorizer that may perform at least one of the operations of deriving a use case characteristic from the processed and/or raw motion sensor data, determining an effective frequency from the processed and/or raw motion sensor data and/or determining an Eigen use case, such that the categorizer may determine a device use case for the portable device using the processed and/or raw motion sensor data and at least one of the use case characteristic, the effective frequency and/or the Eigen use case.

DETAILED DESCRIPTION

Figure 1:
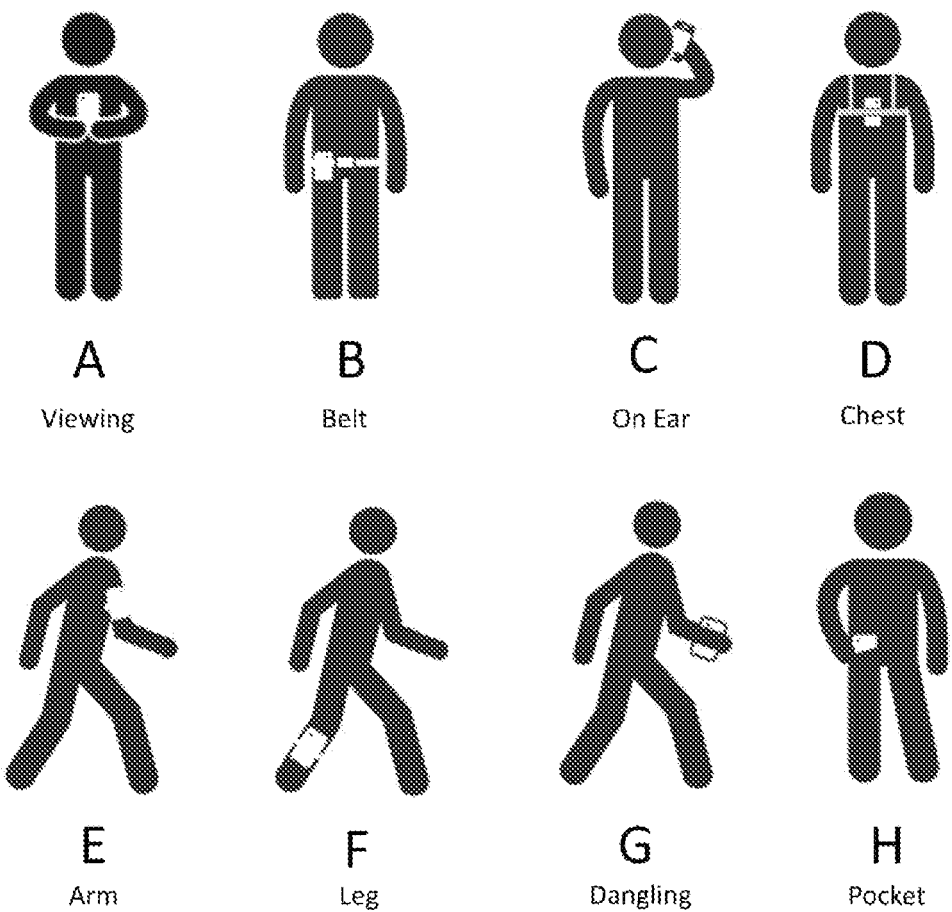
FIG. 1 is schematic diagram of a device use cases that may be classified for a portable device according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration." and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying." "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

During daily activity, a typical portable device may be in a multitude of positions including, handheld, swinging, on ear, in a trouser or shirt pocket, in a belt clip, on an arm band, leg mounted, chest mounted, or in a backpack. As will be appreciated, the relationship between the device and the user may have a significant impact on the data being measured by the different sensors of the device. Although the sensors may detect purposeful motion of the user along a given heading, there may be additional dynamics and motion that will also be reflected in the sensor data. For example, when the user is texting or talking on the device, the dynamics and motion of the device may be substantially different than when the device is being held in a swinging hand, even though the overall motion of the user may be similar (e.g., walking in the same direction at the same speed). Accordingly, the techniques of this disclosure may be employed to identify the device use case to help interpret the motion sensor data. Determining the device use case also facilitates estimation of the relative orientation between the device and the user.

In one aspect, determination of device use case involves characterizing how the user is carrying, holding, or using the device that may be in constrained or unconstrained manner. For example, one benefit of determining a device use case is the ability to estimate the relative orientation between the device and the user. In turn, the estimated relative orientation may be used for applications such as developing a navigational solution. The techniques presented here for categorizing use case may be applied in a wide variety contexts, including during on foot motion of a user at different speeds, such as walking, jogging, or running, as well as accommodating different individual traits, such as varying gaits. To help illustrate examples of different device use cases, FIG. 1 schematically illustrates some common use cases for a user undergoing on foot motion. The depicted examples include: handheld viewing, such as when navigating (when following a compass or route), texting, video recording, reading, and may involve landscape, portrait or arbitrary orientations (including any roll, pitch and heading) in FIG. 1A; belt mounted, including any belt clip, holster, holder or the like, at any location around the belt, and in any orientation, such as horizontal, vertical, or tilted at any angle in FIG. 1B; on ear, when the device is positioned on or near the user's ear for listening/talking in any orientation including horizontal, vertical or tilted in FIG. 1C; chest mounted, with any device orientation including for example horizontal, vertical, or tilted at any angle in FIG. 1D; arm mounted, whether left or right side, with any device orientation such as horizontal, vertical, or tilted at any angle in FIG. 1E; leg mounted, whether left or right side, with any device orientation such as horizontal, vertical, or tilted at any angle in FIG. 1F; dangling or swinging while held in hand or wrist mounted, in any orientation such as horizontal or vertical, and/or undergoing different ranges of movement, such as very light, light, normal, or strong swinging in FIG. 1G; and trouser pocket, whether front, side or back, with any type (tight pocket, loose pocket, etc.) and with any device orientation including for example horizontal, vertical, or tilted in any pose in FIG. 1H. A chest device use case may also include other device use cases in which the device is associated with the trunk or upper torso of the user, such as being carried in a shirt pocket or a backpack. In one aspect, use case may be dictated in part by the form factor of device, such as in smart glasses that are worn on the face or a smart watch that is worn on the wrist.

In the above examples, the viewing, belt, on ear and chest device use cases as shown in FIGS. 1A-D may be considered sub-categorizations of a general device use case characterized by a relatively consistent orientation between the device and the user. When viewing the device, such as for texting, reading, navigating, image recording or the like, or when talking on the device, the user may tend to keep the device in a specific orientation during the use, of course this orientation can change, but it does not typically experience recurrent changes or oscillations. Similarly, in the chest device use cases noted above and the belt device use case, the device is constrained to some degree to the user's trunk. Under these conditions, the motion of the device may be affected to a lesser degree by the movements of other body parts of the user, such as the arms and/or legs. As such, the motion experienced by the device may be similar to the overall motion of the user. Further, during the arm, leg, dangling and pocket device use cases depicted in FIGS. 1E-H, the device may be associated with a body part of the user that is undergoing additional movement that is supplementary to the user's overall movement in the current direction of travel. Notably, the arm of a user may move forward and backwards in a swinging motion during walking, while the leg may also include up and down movements resulting from lifting and lowering the feet. Correspondingly, in the context of the arm device use case, the device may also experience the forward and backward motion of the swinging arm and this influence may be exacerbated by the additional degree of freedom of the elbow joint. Similarly, in the leg and pocket device use case, the device may also experience the leg motion to varying degrees.

Figure 2:
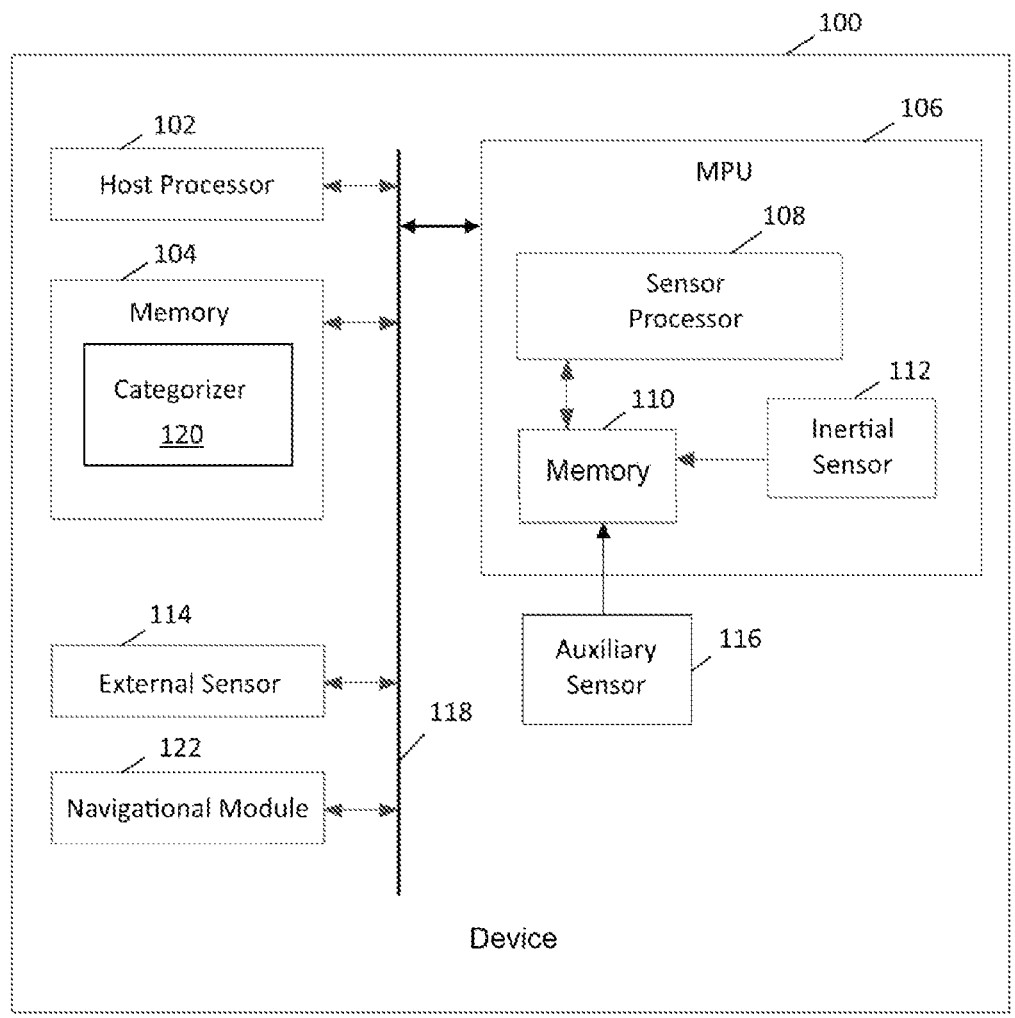
FIG. 2 is schematic diagram of a portable device for categorizing device use case according to an embodiment.

As noted above, the portable device subject to these various device use cases may include a sensor assembly including inertial motion sensors providing measurements that may be classify the device use case corresponding to the current usage of the device by the user. To help illustrate these features, a representative portable device 100 is depicted in FIG. 2 with high level schematic blocks. As will be appreciated, device 100 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated motion processing unit (MPU™) 106 featuring sensor processor 108, memory 110 and inertial sensor 112. Memory 110 may store algorithms, routines or other instructions for processing data output by inertial sensor 112 and/or other sensors as described below using logic or controllers of sensor processor 108, as well as storing raw data and/or motion data output by inertial sensor 112 or other sensors. Inertial sensor 112 may be one or more sensors for measuring motion of device 100 in space. Depending on the configuration, MPU 106 measures one or more axes of rotation and/or one or more axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using Micro Electro Mechanical System (MEMS) to be integrated with MPU 106 in a single package. Exemplary details regarding suitable configurations of host processor 102 and MPU 106 may be found in co-pending, commonly owned U.S. patent application Ser. No. 11/774,488, filed Jul. 6, 1007, and Ser. No. 12/106,921, filed Apr. 11, 1008, which are hereby incorporated by reference in their entirety. Suitable implementations for MPU 106 in device 100 are available from InvenSense, Inc. of Sunnyvale, Calif.

Alternatively, or in addition, device 100 may implement a sensor assembly in the form of external sensor 114. External sensor may represent one or more sensors as described above, such as an accelerometer and/or a gyroscope, that outputs data for categorizing, recognizing, classifying or otherwise determining device use case. As used herein, "external" means a sensor that is not integrated with MPU 106 and may be remote or local to device 100. Also alternatively or in addition, MPU 106 may receive data from an auxiliary sensor 116 configured to measure one or more aspects about the environment surrounding device 100. For example, a barometer and/or a magnetometer may be used to refine position determinations made using inertial sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 102, memory 104, MPU 106 and other components of device 100 may be coupled through bus 118, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

In one aspect, the various operations of this disclosure used to categorize a device use case for portable device 100 may be implemented through categorizer 120 as a set of suitable instructions stored in memory 104 that may be read and executed by host processor 102. Other embodiments may feature any desired division of processing between host processor 102, MPU 106 and other resources provided by device 100, or may be implemented using any desired combination of software, hardware and firmware.

Multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 102 and MPU 106, for example, to transmit desired sensor processing tasks. As such, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 102, sensor processor 108, a dedicated processor or any other processing resources of device 100.

Device 100 may also include navigational module 122 that employs a reference-based strategy, a self-contained strategy, or any combination of strategies. Navigational module 122 may provide any desired degree of location awareness capabilities. Representative technologies that may be embodied by navigational module 122 include global positioning system (GPS), global navigation satellite system (GLONASS), Galileo and Beidou, as well as WiFi™ positioning, cellular tower positioning, Bluetooth™ positioning beacons, dead reckoning or other similar methods. Navigational module 122 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Alternatively or in addition, navigational module 122 may employ inertial navigation techniques utilizing sensor data, such as from inertial sensor 112 and/or external sensor 114. Such techniques may involve dead reckoning or the like, and may determine an orientation for device 100, including values such as any roll, pitch, and azimuth (heading) angles.

Generally, device use cases that have some constraint to the user's trunk exhibit relatively less movement in addition to the overall movement of the user. Notably, these device use cases include the chest mounted example of FIG. 1D but also the general example of FIG. 1A. Typically, when the user is actively viewing (or inputting) content with a portable device, the user keeps the device in a relatively fixed position with respect to the user's trunk. In contrast, when the device is in a belt clip, in pocket, arm or leg mounted, or when the hand is swinging, such as in FIGS. 1B-1C and 1E-1G, the trunk motion of the user as well as additional motion attributable to movement and interrelation of other body parts is reflected in the sensor data. Different criteria may be employed to accommodate a user's different speeds of locomotion or gain, or to accommodate the varying speeds, gaits, behaviors and dynamics of different users.

The following materials describe deriving use case characteristics from processed and/or raw motion sensor data, determining an effective frequency of motion, and/or determining an Eigen use case so that at least one of these factors may be used to categorize a device use case for portable device 100. As such, representative operations that may be performed by categorizer 120 are depicted in the flow chart of FIG. 3. Beginning with 300, inertial sensor data may be obtained that represents motion of device 100, such as from accelerometer and/or gyroscope data from inertial sensor 112 or any other suitable sources of measurement, including external sensor 114. The inertial sensor data optionally may be processed in 302 as indicated. Depending on the embodiment, raw motion sensor data may be used and 302 may be omitted, the motion sensor data may be processed in 302 and/or both processed and raw motion sensor data may be employed. As will be described, processing may include performing filtering operations, such as with a low pass filter to reduce noise. Further, processing may include leveling one or more sensor measurements to represent an orientation of device 100, such as in the form of determined roll or pitch angles that may be obtained from navigation module 122 or by any other suitable means. The routine then may branch to one, all or any combination of the operations indicated by 304, 306 and 308. In 304, one or more use case characteristics may be derived from the processed and/or raw motion sensor data. In 306, an effective frequency of the processed and/or raw motion sensor data may be identified. In 308, an Eigen use case may be determined from the processed and/or raw motion sensor data. Correspondingly, the results from any or all of 304, 306 and 308 may be used to determine a device use case for portable device 100 in 310. As noted above, the operations described as being performed by categorizer 120 may be performed by any number of routines or algorithms implemented by any combination of available processing resources. For example, initial processing of gyroscope and/or accelerometer data, such as some or all of the operations associated with 302, may be performed by sensor processor 108 before being passed to host processor 104 for subsequent operations. As described above, the present disclosure relates to a method for categorizing a device use case for on foot motion with a portable device that may include obtaining motion sensor data corresponding to motion of the portable device, processing the motion sensor data, performing at least one of deriving a use case characteristic from the processed and/or raw motion sensor data, determining an effective frequency from the processed motion and/or raw sensor data and determining an Eigen use case, such that categorizing the device use case of the portable device may use the processed and/or raw motion sensor data and at least one of the use case characteristic, the effective frequency and the Eigen use case.

In one aspect, processing the motion sensor data may include transforming the motion sensor data at least in part with a determined orientation of the portable device. For example, vertical acceleration may be characterized by leveling accelerometer data using the determined orientation of the portable device. Vertical acceleration may also be characterized by subtracting gravity. Horizontal motion may also be characterized by leveling accelerometer data using the determined orientation of the portable device. Still further, magnitude may be determined for gyroscope data.

In one aspect, deriving the at least one use case characteristic may include performing a statistical analysis. For example, an effective orientation component may be determined. Further, peaks in the effective orientation component may be detected. Detecting peaks may include applying a threshold determined at least in part on a statistical analysis of the effective orientation component.

In one aspect, deriving the at least one use case characteristic may include determining a radius of rotation value for the portable device.

In one aspect, deriving the at least one use case characteristic may include detecting peaks in the processed and/or raw motion sensor data. For example, peaks may be detected by applying a threshold determined at least in part on a statistical analysis of the motion sensor data. The motion sensor data may be leveled/non-leveled, processed/raw sensor data. Further, detecting peaks may include determining peaks frequency. Still further, a range of the peaks frequency may be determined, such as by determining a threshold for the range of the peaks frequency.

In one aspect, deriving the at least one use case characteristic may include assigning an attribute to the motion sensor data. The at least one attribute of the processed and/or raw motion sensor data may be assigned based at least in part on a derived use case characteristic. Examples of attributes that may be assigned include a not dangling attribute, a dangling attribute, a pocket attribute, a radius of rotation attribute, a slow radius of rotation attribute, a general attribute, a belt attribute and an on ear attribute.

In one aspect, unstable motion characteristics may be identified. Correspondingly, categorizing the device use case of the portable device may include assigning at least one attribute of the processed motion and/or raw sensor data.

In one aspect, normal motion characteristics may be identified. Correspondingly, categorizing the device use case of the portable device may be based on at least one of the following: (i) a statistical analysis of the processed and/or raw motion sensor data; (ii) a statistical analysis of an effective orientation component; (iii) a radius of rotation value; (iv) identifying a number of peaks in the processed and/or raw motion sensor data and comparing it to a threshold; and (v) a range of peaks in the processed and/or raw motion sensor data. Alternatively or in addition, categorizing the device use case of the portable device may be based at least in part on detecting a characteristic pattern of peaks in the processed and/or raw motion sensor data. Categorizing the device use case of the portable device may also be based on a range of peaks in the processed and/or raw motion sensor data. Also alternatively or in addition, categorizing the device use case of the portable device may be based at least in part on assigning at least one attribute of the processed and/or raw motion sensor data.

In one aspect, categorizing the device use case of the portable device may be based on an effective frequency in the processed and/or raw motion sensor data. The effective frequency may be determined using a frequency domain analysis, such as a Fast Fourier Transformation (FFT). Alternatively, the effective frequency may be determined using a time domain analysis. In one aspect, the effective frequency may be determined using a time domain analysis and by calculating a signal power and a power ratio of the processed and/or raw motion sensor data.

In one aspect, categorizing the device use case of the portable device may be based on determination of an Eigen use case. For example, features extracted from the processed and/or raw motion sensor data may be matched to at least one stored Eigen use case to determine the device use case. The at least one stored Eigen use case may include a set of eigenvectors developed during a training phase.

In one aspect, a navigation solution for the portable device may be derived based at least in part on the motion sensor data and the categorization of device use case.

This disclosure also includes a portable device for categorizing a device use case for the portable device that may have a sensor assembly integrated with the portable device, configured to output data representing motion of the portable device, a processor configured to process the motion sensor data and a categorizer configured to perform at least one of the operations of deriving a use case characteristic from the processed and/or raw motion sensor data, determining an effective frequency from the processed and/or raw motion sensor data and determining an Eigen use case, such that the categorizer determines a device use case for the portable device using the processed and/or raw motion sensor data and at least one of the use case characteristic, the effective frequency and the Eigen use case.

In one aspect, the portable device may also include a navigation module configured to provide a navigation solution for the portable device derived at least in part on the motion sensor data and the determined device use case.

In one aspect, the sensor assembly of the portable device may include an accelerometer and a gyroscope.

In one aspect, the sensor assembly may include an inertial sensor implemented as a Micro Electro Mechanical System (MEMS).

Examples

Figure 3:
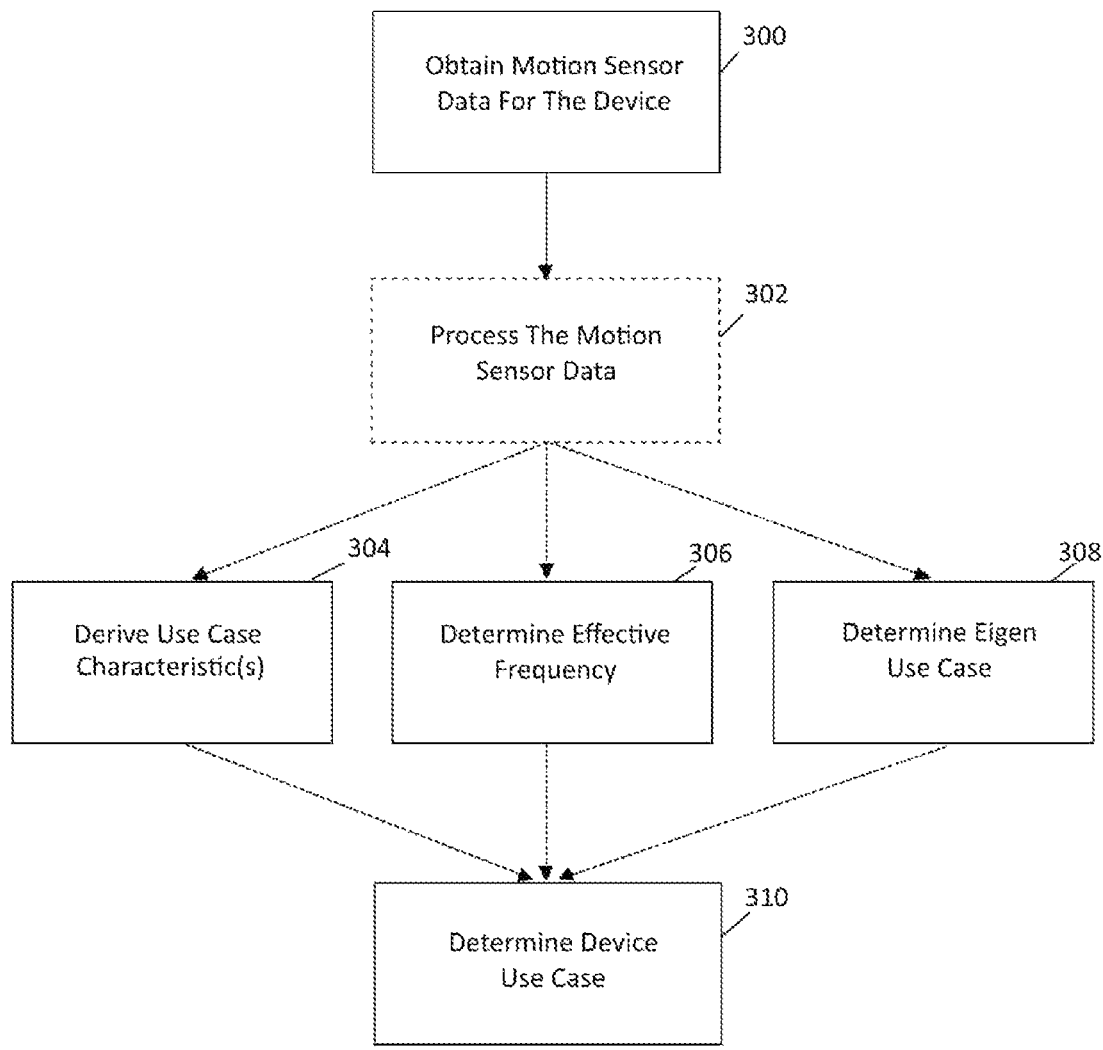
FIG. 3 is a flowchart showing a routine for categorizing device use case according to an embodiment.

As described above, the techniques of the disclosure may involve processing the motion sensor data to level or translate between different reference frames as represented by 302 of FIG. 3. Depending on the embodiment, the operations associated with processing the motion sensor data may be distributed between categorizer 120, MPU 106 and any other processing resources of device 100 in any desired proportion. Further, the types of processing performed may be adapted as warranted. In one aspect, accelerometer and/or gyroscope data may be processed using Euler rotations, quaternions or other methods to convert the output of inertial sensor 112 from the coordinate system of device 100, or its body frame, to a suitable reference coordinate system, such as the local level frame. While the body frame may be established by the orthogonal axes of inertial sensor 112, the local level frame, as an illustration only and without limitation, may include any suitable reference, such as a North, East, Down (NED) convention, in which down is aligned with gravity, or East, North, Up (ENU). In the following discussion, the roll angle is defined as the angle that rotates around x-axis of the body frame while pitch angle is defined as the angle that rotates around y-axis (after levelling with roll angle). In one aspect, horizontal and/or vertical components may be extracted from the motion sensor data. Other coordinate systems, reference frames and/or translation techniques such as quaternions may be used as desired. Pitch and roll angles may be calculated from gyroscope data, from accelerometer data or averaged accelerometer data (whether fixed-time average or moving average), and/or an integrated navigation solution as obtained from navigation module 122 using any type of integration technique and integrating different sensors and/or systems for example some or all of the following: accelerometers, gyroscopes, magnetometers, barometer, or any navigational information updates (such as, for example, GNSS, WiFi™, or any other wireless technique). Other suitable techniques may also be employed. Processing the motion sensor data may also include removing a gravity value from the leveled vertical accelerometer data.

Depending upon the device use case, categorizer 120 may derive one or more use case characteristic in 304 when determining the device use case in 310 of FIG. 3. As described in the following materials, a number of suitable use case characteristics may be employed.

Figure 4:
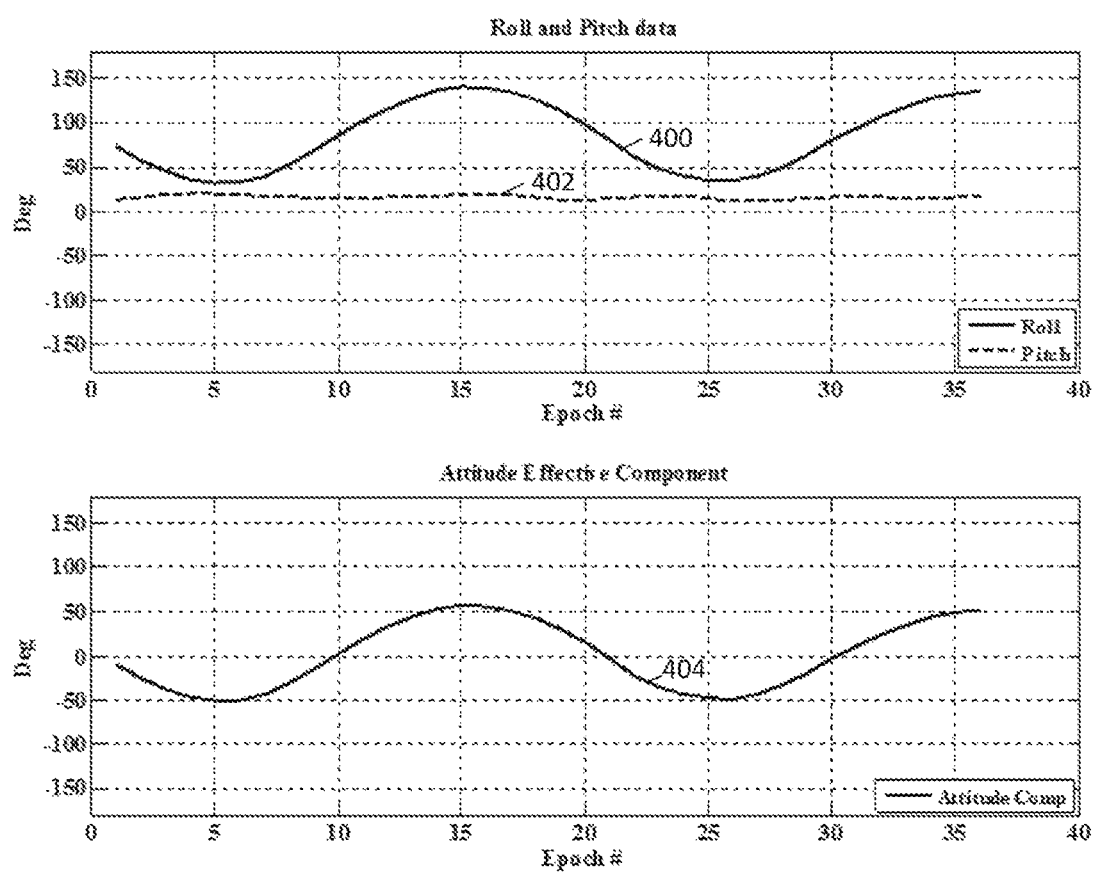
FIG. 4 is a graphical representation of a first example of an effective orientation component in relation to pitch and role values according to an embodiment.
Figure 5:
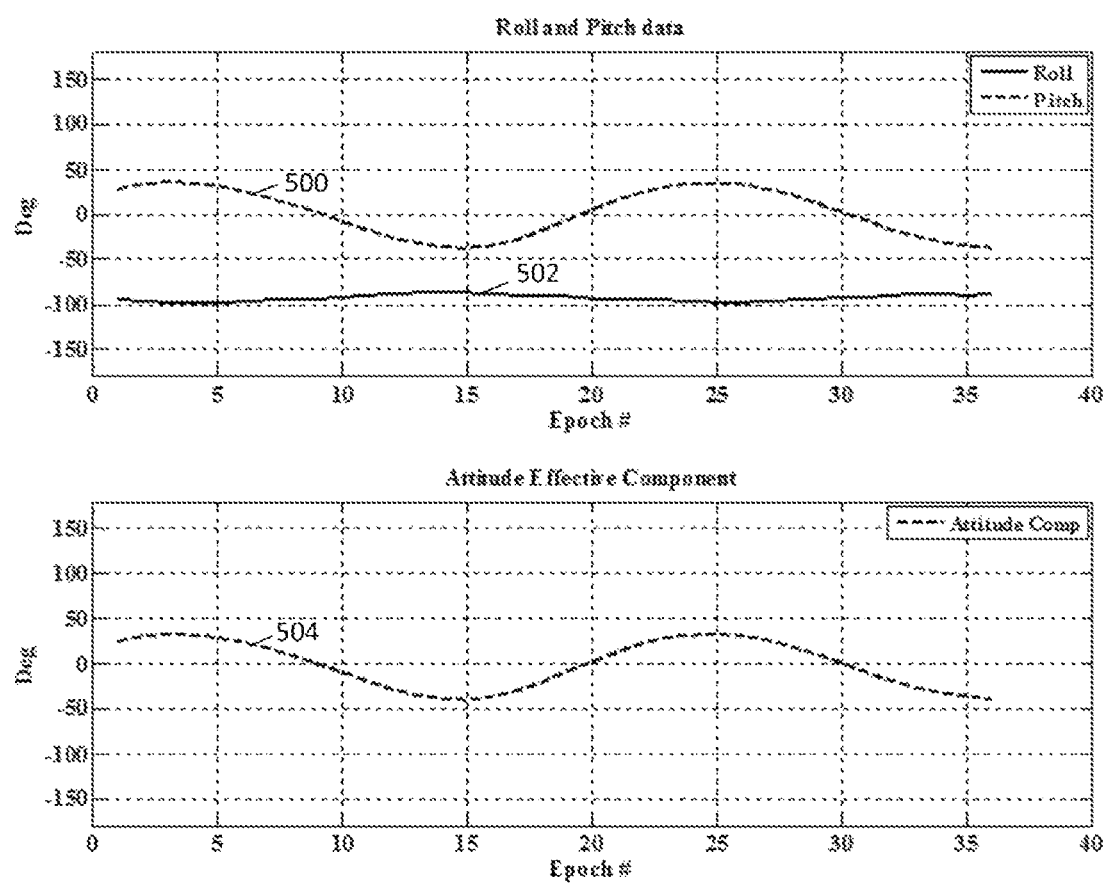
FIG. 5 is a graphical representation of a second example of an effective orientation component in relation to pitch and role values according to an embodiment.

In one aspect, the use case characteristic employed in 304 of FIG. 3 may be a determined effective orientation component. Signal orientation may be defined by the roll and pitch angles which indicate the orientation of device 100. Accordingly, the degree of change in the value for these angles may identify which is more significantly affected by motion of the user. Since device 100 may have any orientation, the roll may range between −180° and °180° while the pitch may range between −90° to 90°°. Correspondingly, the effective orientation component refers to either the roll or pitch component, depending on which is more affected by user motion. As an illustration, the top graph of FIG. 4 shows the roll angle for device 100 over time as trace 400 and the pitch angle as trace 402. As a result, the bottom graph indicates that the roll angle is used to generate the effective orientation component represented by trace 404. This derived component may be centered around zero degrees as shown if desired. For comparison, the top graph of FIG. 5 shows the pitch angle for device 100 as trace 500 and the pitch angle as trace 502, resulting in the effective orientation component represented by trace 504 corresponding to the pitch angle.

In one aspect, the use case characteristic employed in 304 of FIG. 3 may be a parameter calculated from the processed and/or raw motion sensor data and/or the effective orientation component. The parameter may be statistical or another feature. For example, the mean, standard deviation and/or range may be determined for a desired component of the motion sensor data. This may include performing a statistical analysis on the processed data, such as the leveled accelerations. As will be appreciated, such parameters may indicate signal features such as strength and range of variation. The calculated parameter may also be the magnitude of one or more components of the motion sensor data, such as the magnitude of the gyroscope and/or the accelerometer data in three dimensions. Another suitable parameter includes the change in slope of a processed and/or raw motion sensor data component and/or an effective orientation component. For example, the change in slope of horizontal acceleration may be used to identify periodicity in motion of the user. Yet another example of a suitable parameter is the sum of differences of the roll and pitch data representing orientation of device 100, as relatively large sum of difference values imply a sharp slope change of the signal and relatively small sum of difference values imply a flat signal.

In one aspect, the use case characteristic employed in 304 of FIG. 3 may involve an analysis of peaks in the signal of a component of the processed and/or raw motion sensor data, magnitude of processed and/or raw motion sensors data, and/or an effective orientation component. Without limitation, peaks may be detected in a raw acceleration data, leveled horizontal acceleration component, a leveled vertical acceleration component and/or an effective orientation component and different detection criteria may be employed for each signal. One suitable criterion is the slope threshold value for change in slope that when exceeded results in detection of a peak. Since the appropriate slope threshold may vary depending upon different dynamics of an individual user undergoing different kinds of locomotion or the dynamics of different users, a slope threshold value may be set as a fixed number or determined using the statistical parameters discussed above, such as range and standard deviation values. The slope threshold values may then be incremented or decremented according to the required number of peaks to be detected in the signal of interest. Different movement dynamics may be taken into consideration, including the speed of the user or walking/running style. These characteristics may be established, for example, by experiment to determine the corresponding ranges of vertical acceleration. Thus, the slope threshold may be adjusted to fit the motion style of the user. Peak detection may also involve removing certain peaks that may not meet other criteria. For example, high peaks may be required to be greater than the signal of interest mean value and low peaks may be required to be less than the signal of interest mean value.

Further, values may calculated with respect to the signal mean such that the range of values greater than the mean and less than the mean is proportional to the variation in the signal values. Additionally, the thresholds may be adapted according the amplitude of the signal to account for unexpected and/or irregular moving behavior. For example, different values may be assigned as thresholds for the raw accelerations, leveled horizontal acceleration, leveled vertical acceleration, and effective orientation signals. These thresholds may be used to recognize various signal dynamics and shapes. Signal mean and standard deviation values may be used to calculate the thresholds, with the assigned values adapted to changes in the signal shape and characteristics in order to scale for the different behaviors of the user dynamics. For each signal, two or more values may be calculated with respect to the signal mean, including values above the mean values below the mean. The range of these values may also be proportional to the variation in the signal values.

Once a signal peaks are detected, the peaks frequency may be assessed. In one embodiment, the high and low peaks in the leveled vertical acceleration signal over a window of data may be used to calculate a peaks frequency value. Frequency may refer to the number of peaks per second such that the time difference between consecutive high and low peaks may be summed and averaged. Multiplying the result by the sample rate of the sensor gives the peaks frequency, which may correlate with the locomotion speed of the user as a shorter period of repetition tends to indicate more rapid movement.

Another attribute that may be assessed following peaks frequency calculation is a peaks frequency range value, which may be calculated from a history of the peaks frequency values. The peaks frequency range values provides an indicator about the consistency of the user speed and may be observed over a period of time to evaluate behavior of the user. Yet another attribute that may be assessed following peak detection is a peaks frequency range threshold that relates to the variation in a motion sensor data component, such as vertical acceleration. When a relatively large variation exists in the component, it may be desirable to employ a relatively larger threshold value.

In one aspect, the use case characteristic employed in 304 of FIG. 3 may be a radius of rotation parameter. The value of the radius of rotation parameter provide information about the device movement such that relatively smaller values represent a relatively greater change in the device movement while the relatively larger values represent less change. Further, a radius of rotation counter may be used to indicate the number of motion sensor data samples that have radius of rotation values less than certain threshold. This counter reflects the amount of change orientation of device 100. The value of the threshold may correspond to a candidate device use case. For example, the values of the radius of rotation may be larger when device 100 is in general viewing mode, such as being held in hand for texting or reading, than in dangling mode, when device 100 is held in a swinging hand.

In one aspect, the use case characteristic employed in 304 of FIG. 3 involves identifying an attribute associated with a pattern of processed and/or raw motion sensor data that may be used to influence the device use case determination. A number of attributes and their associated patterns of processed and/or raw motion sensor data are described in the following materials, but the techniques of this disclosure are not limited to these embodiments and others may be applied as suitable. For convenience, some of these attributes employ similar terminology to one or more potential device use cases, but typically the identification of an attribute alone is not determinative of the device use case and instead constitutes a contribution to the overall determination in conjunction with other use case characteristics.

One representative example of an attribute that may be identified for a pattern of processed and/or raw motion sensor data is a "not dangling" attribute. Dangling device use cases tend to be associated with horizontal and vertical acceleration signals that exhibit a relatively smooth shape, so the not dangling attribute may be assigned when the motion sensor data is not sufficiently smooth. In one embodiment, if the vertical accelerometer signal has two peaks relatively close to each other with an oppositely oriented peak in between, the not dangling attribute may be assigned. Conversely, a "dangling" attribute may be assigned when a motion sensor data component is sufficiently smooth. In one embodiment, this attribute may be assigned based on accelerometer signal parameters. When the user is holding device 100 in a swinging hand, the horizontal acceleration component may have a larger range than the vertical acceleration component as the horizontal component is augmented by the swinging arm motion. As such, when a pattern of motion sensor data has a leveled horizontal acceleration component with a larger variation in magnitude than the leveled vertical acceleration component, the dangling attribute may be assigned.

Figure 6:
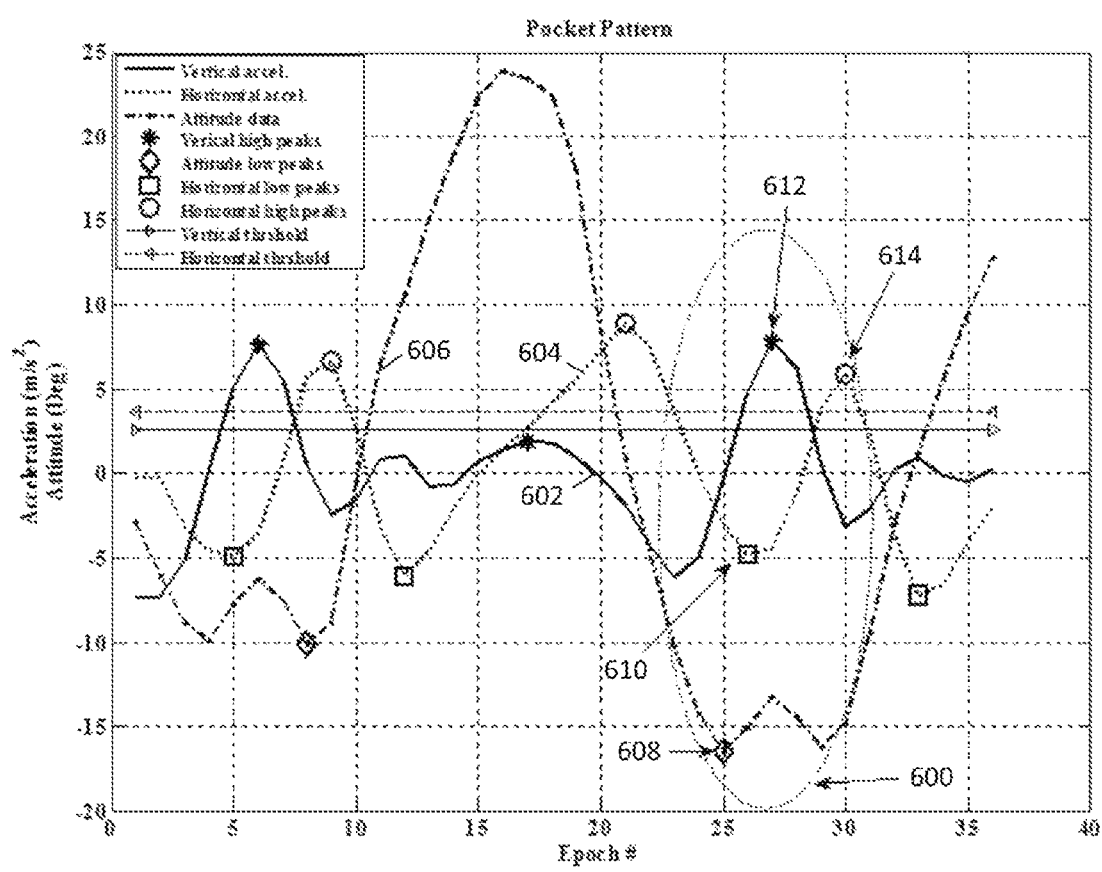
FIG. 6 is a graphical representation of a pattern of use characteristics consistent with a pocket attribute according to an embodiment.

Another representative example of an attribute that may be identified for a pattern of processed and/or raw motion sensor data is a "pocket" attribute, which may be used to help reach a determination of a pocket device use case. In one embodiment, a combination of different peak detections for different signals may be employed, such as the high and low peaks of the effective orientation component, the raw accelerations, the leveled horizontal acceleration signal and/or the leveled vertical acceleration signal. The order of the peak occurrences and relative differences between the peaks of the different signals may present one or more patterns that may be associated with a pocket device use case. An illustration of a suitable pattern is depicted in FIG. 6, which exhibits a sequence of peaks 600 in the vertical acceleration signal represented by trace 602, in the horizontal acceleration signal represented by trace 604 and in the effective orientation component represented by trace 606. As shown, peak sequence 600 includes low peak 608 in the effective orientation component, followed by low peak 610 in the horizontal acceleration signal, then high peak 612 in the vertical acceleration signal and then high peak 614 in the horizontal acceleration signal. Other peak sequences may also be associated with the pocket device use case. The assignment of the pocket attribute may also depend on other identified attributes. For example, the pocket attribute may be assigned only if the dangling attribute is not assigned.

Yet another representative example of an attribute that may be identified for a pattern of processed and/or raw motion sensor data is a "radius of rotation" attribute, which may be used to indicate variation in the movement of device 100. As discussed with regard to the radius of rotation use case characteristic, a counter may be employed to track the number of times the radius of rotation values are less than an appropriate threshold. As an illustration, the vertical acceleration variance values may be divided into four levels from 0 to 30 and a radius of rotation counter threshold value may be set according to the different levels of the vertical acceleration variance. The values of the radius of rotation counter and threshold are compared to assign the radius of rotation attribute. In one embodiment, the attribute may be assigned when the counter is less than the threshold.

Another related example of an attribute that may be identified for a pattern of motion sensor data is a "radius of rotation slow" attribute to help distinguish between different gaits and speeds. This attribute may be assigned based on the radius of rotation counter value, the maximum change in the roll and pitch values, the variation in the gyroscope magnitude and the vertical acceleration variance value.

Another representative example of an attribute that may be identified for a pattern of processed and/or raw motion sensor data is a "general" attribute, which may be used to categorize device use cases that do not include dangling or pocket device use cases, such as viewing, belt, on ear and chest. Suitable parameters that may be used to assign the general attribute include radius of rotation, vertical acceleration variance, and variation in roll and pitch angles. In one embodiment, the general attribute may be assigned is set based on the radius of rotation and radius of rotation slow attributes. For example, when the vertical acceleration variance is small, the general attribute may be assigned in coordination with the radius of rotation slow attribute and when the value of the vertical acceleration variance is high, the general attribute may be associated with the radius of rotation attribute.

Other attributes may be assigned to help distinguish between device use cases that exhibit similar patterns of processed and/or raw motion sensor data. One such attribute is a "belt" attribute to differentiate the pocket device use case. Generally, the pocket device use case exhibits greater variation in orientation angles (roll and pitch) than the belt use case. However, in some cases, such as when belt clip is loose, motions sensor data when device 100 is mounted on a belt appears similar to the data when carried in a pocket. Correspondingly, this attribute may be used to distinguish between the pocket and belt device use cases. In one embodiment, the belt attribute may be assigned based on the variation in movement of device 100, the values of the orientation angles (roll and pitch), and the variation in the orientation angles. Further, variation in the vertical acceleration high and low peaks may also be employed, optionally in conjunction with the number of vertical acceleration and horizontal acceleration high and low peaks.

Another representative example of an attribute that may be identified for a pattern of processed and/or raw motion sensor data is an "on ear" attribute. While making a phone call, device 100 may be held by the user in different orientations such as with the speaker facing backwards or upwards, or at other positions. As such, the on ear attribute may be assigned based on the value of the orientation angles (roll and pitch) and the variation in the horizontal acceleration signal in one embodiment. For example, the sequence of the vertical acceleration high peaks and their location with respect to each other may be used to assign the on ear attribute. Further, the shape of the horizontal acceleration signal shape may also be used when assigning the one ear attribute.

Other representative examples of attributes that may be identified for a pattern of processed and/or raw motion sensor data are the "leg" and "arm" attributes. The leg attribute may be used to identify when device 100 is mounted to the leg of the user. In one embodiment, the horizontal acceleration may have a greater variation (in range and variance) than the vertical acceleration. For example, the ratio between the range of the horizontal and vertical acceleration may be greater than two-fold. Similarly, the arm attribute may be used when device 100 is attached to the user's arm. In one embodiment, the sequence of the vertical and horizontal peaks occurrence may be used in assigning this attribute. Typically, an arm device use case exhibits a specific sequence of high and low peaks, with the values of the peaks located around the average value of the peaks at any side. For example, a sequence may comprise three or more high peaks or three or more low peaks that alternate between being greater than the average value and being less than the average value.

Figure 7:
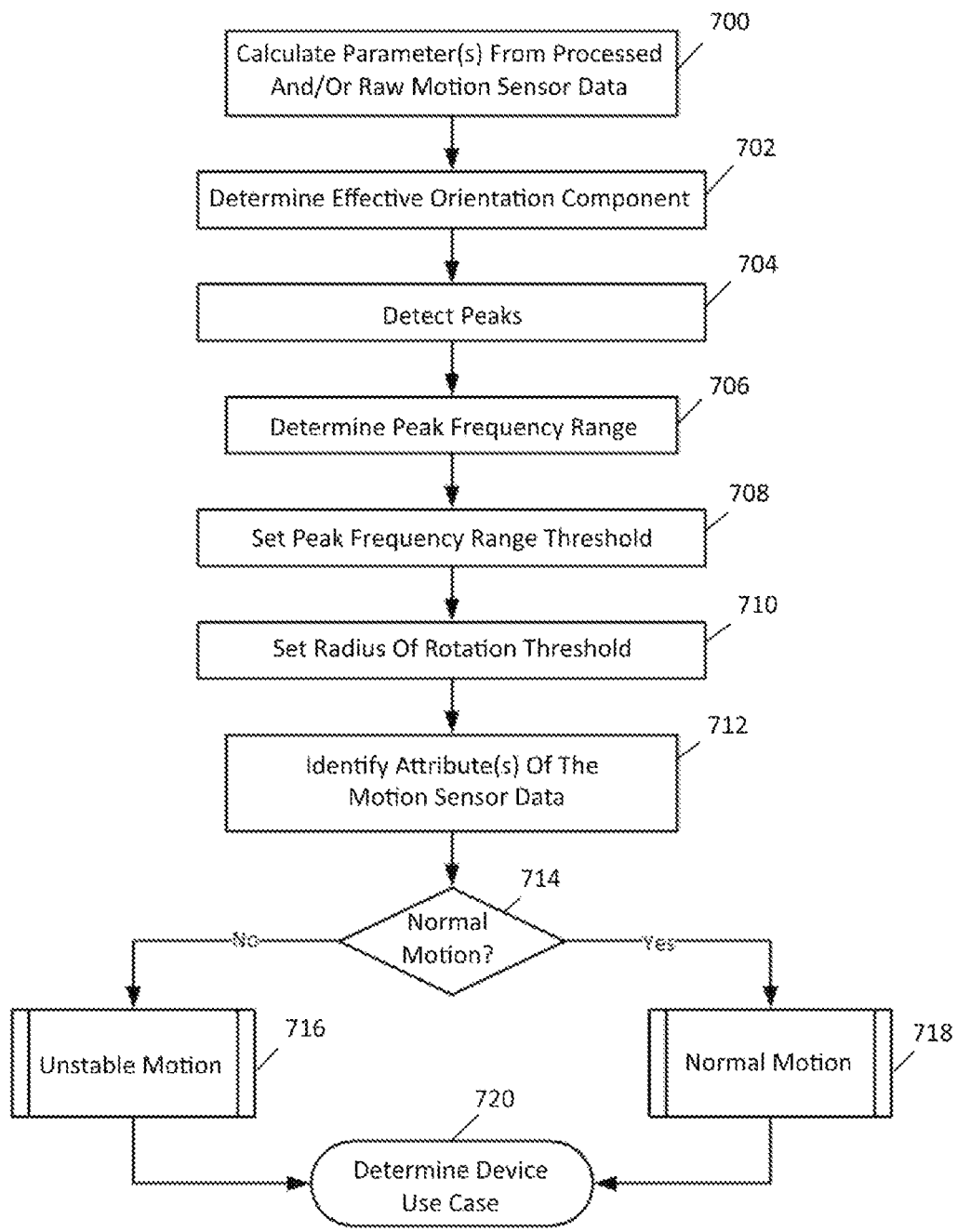
FIG. 7 is a flowchart showing a routine for categorizing device use case using at least one use case characteristic according to an embodiment.

As noted, the techniques of this disclosure may include determining a device use case with categorizer 120 based on one or more derived use case characteristics as represented by 304 of FIG. 3. In one embodiment, a suitable routine for making such a determination is depicted in the flow chart of FIG. 7. As shown, beginning with 700 this may include calculating one or more parameters for the processed motion sensor data of 302 and/or the raw motion sensor data of 300 of FIG. 3, such as the mean, standard deviation, range, variation, or other suitable parameter, either as described above or otherwise within the scope of this disclosure. In 702, the effective orientation component may be determined. In 704, peaks may be detected in one or more components of the processed and/or raw motion sensor data, such as the leveled acceleration signals and/or the effective orientation component. Next, in 706 the peaks frequency range for the detected peaks may be determined. In 708, the peaks frequency range threshold may be set. In 710, the radius of rotation threshold may be set. As described above, thresholds may be set or adjusted based on any suitable parameters of the processed and/or raw motion sensor data to accommodate varying user dynamics, for example. Then, in 712, one or more attributes of the processed and/or raw motion sensor data may be identified. The materials above describe the not dangling, dangling, pocket, radius of rotation, radius of rotation slow, general, belt, on ear, arm and leg attributes. In addition, other suitable attributes may be identified in a similar manner as warranted based on the potential device use case categories or other factors.

Figure 8:
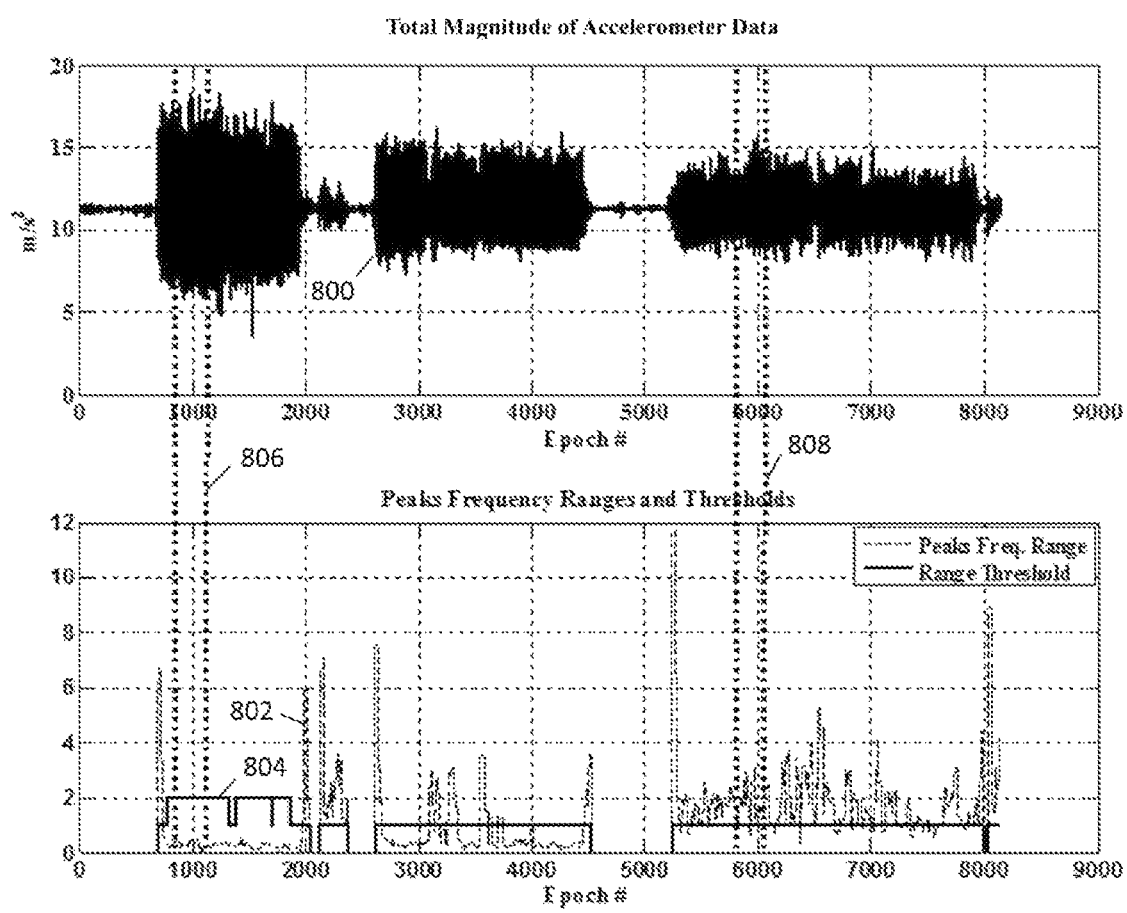
FIG. 8 is a graphical representation of use characteristics consistent with normal motion and with unstable motion according to an embodiment.

As indicated by 714, the routine may branch depending on whether the parameters and other use characteristics of the processed and/or raw motion sensor data are consistent with unstable motion or normal motion. For example, parameters associated with the acceleration signal, including the total magnitude of accelerometer data as may be determined in 700, the peaks frequency range determined in 706 and the peaks frequency range threshold set in 708, may be used to distinguish between unstable and normal motion as illustrated by the graphs shown in FIG. 8. The top graph shows the accelerometer data total magnitude represented by trace 800 while the bottom graph shows the corresponding peaks frequency ranges represented by trace 802 in relation to the peaks frequency range threshold represented by trace 804. During window 806, shown in greater detail in FIG. 9, these parameters are consistent with normal motion, while during window 808, shown in greater detail in FIG. 10, these parameters are consistent with unstable motion. One embodiment that may be implemented when unstable motion characteristics exist is indicated by 716 and described in further detail with regard to FIG. 11 and one embodiment that may be implemented when normal motion characteristics exist is indicated by 718 and described in further detail with regard to FIG. 15. Depending upon the results from 716 or 718, the routine may then determine a device use case in 720.

Figure 9:
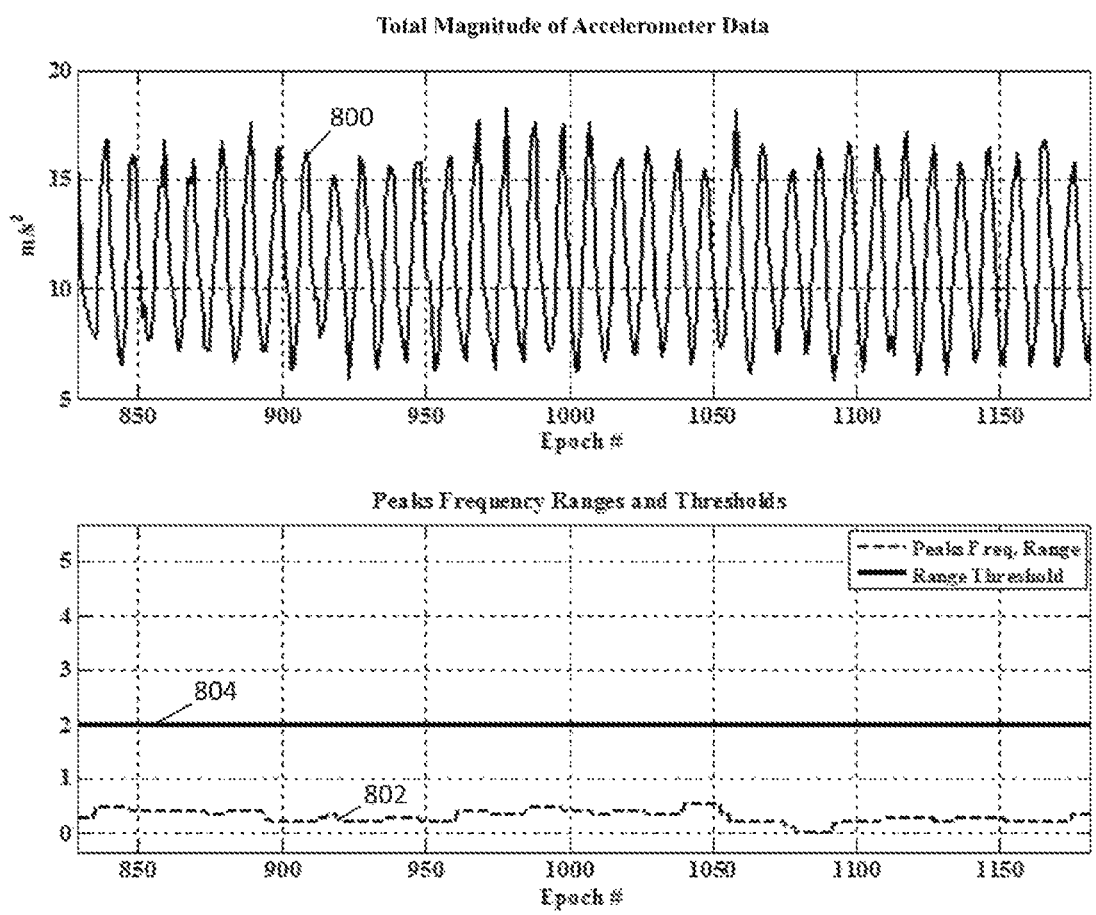
FIG. 9 is a more detailed graphical representation of the use characteristics shown in FIG. 8 showing a pattern consistent with normal motion according to an embodiment.
Figure 10:
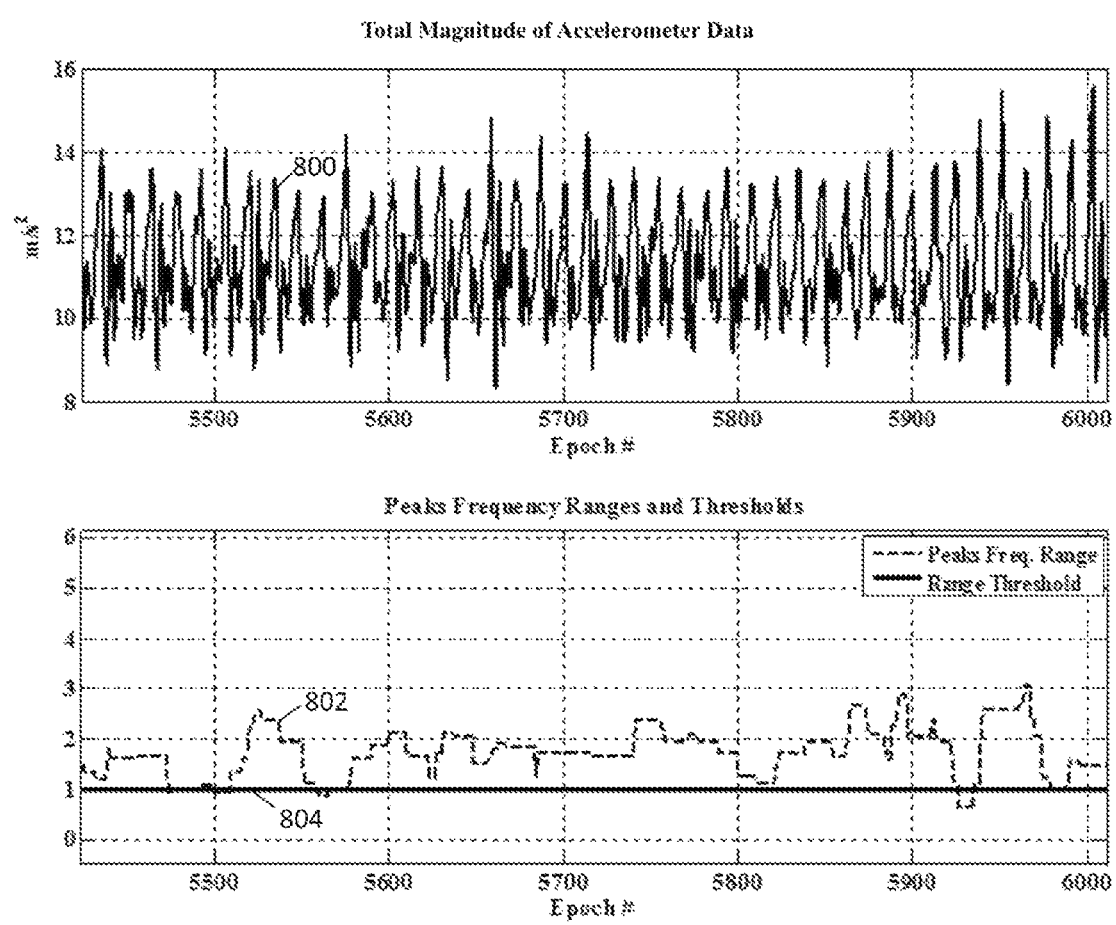
FIG. 10 is a more detailed graphical representation of the use characteristics shown in FIG. 8 showing a pattern consistent with unstable motion according to an embodiment.

As shown in FIG. 9, the peaks frequency range threshold represented by trace 804 is greater than the peaks frequency ranges represented by trace 802 during window 806, while the shape of the accelerometer data total magnitude represented by trace 800 is relatively regular and even. Conversely, FIG. 10 shows that the peaks frequency ranges represented by trace 802 regularly exceeds the peaks frequency range threshold represented by trace 804 during window 808 and the shape of the accelerometer data total magnitude represented by trace 800 is irregular with significant variation between the values of adjacent peaks. Accordingly, either an unstable motion routine as indicated by 716 or a normal motion routine as indicated by 718 may be performed based on these distinctions.

Figure 11:
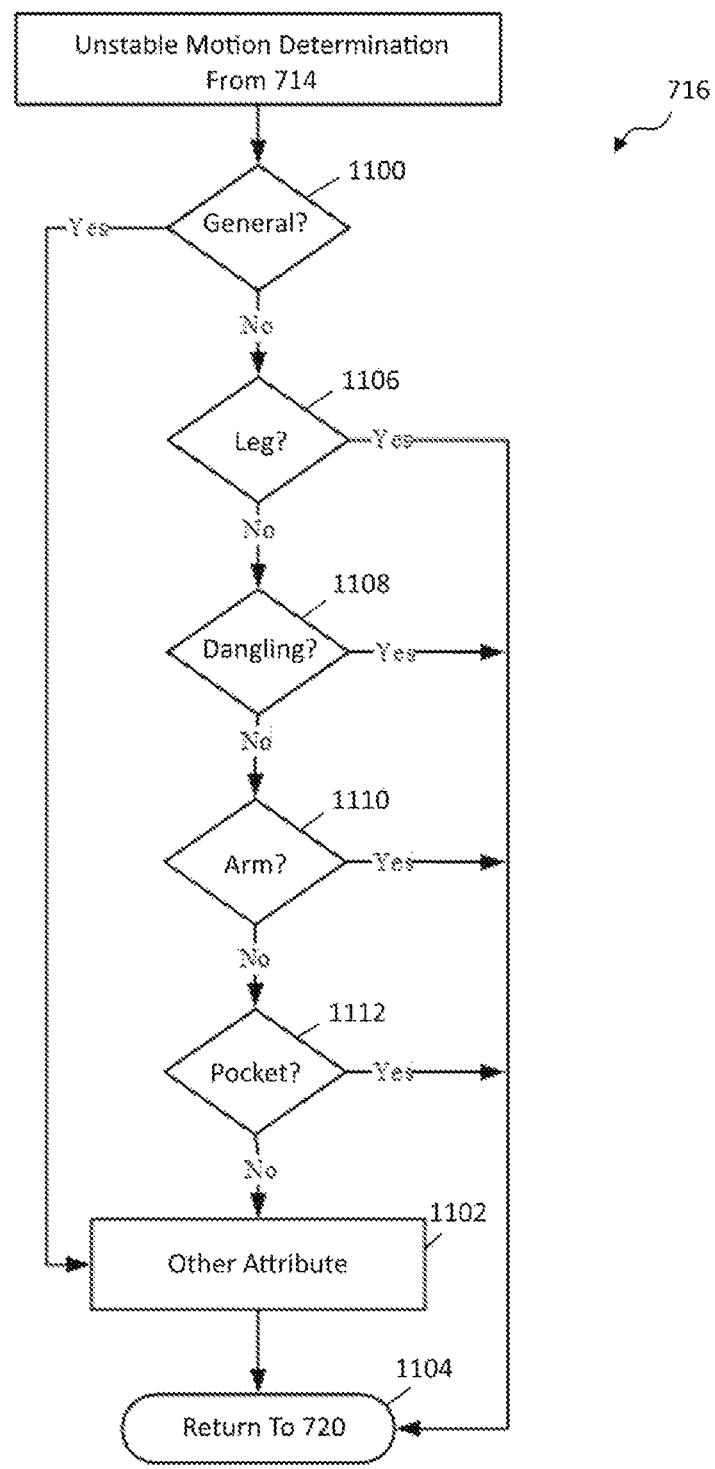
FIG. 11 is a flowchart showing a routine for categorizing device use case for unstable motion according to an embodiment.

With regard to FIG. 11, aspects of one embodiment of unstable motion routine are represented by the depicted flow chart. As indicated, this routine involves a comparison of the attributes identified in 712. Beginning with 1100, categorizer 120 may first determine whether the general attribute has been assigned to the processed and/or raw motion sensor data. If so, the routine flows to 1102 to determine which other attribute has been identified and assigned that may be used to determine the device use case. For example, following assignment of the general attribute, the determined device use case may depend on whether an attribute such as on ear or belt has also been assigned. Other attributes may be employed as warranted. For example, a general attribute may be employed when other attributes are not assigned. In 1104, the routine returns to 720 for determination of device use case using the other attribute of 1102. When the general attribute has not been assigned in 1100, categorizer 120 may then determine in 1106 whether the leg attribute has been assigned to the processed and/or raw motion sensor data. If so, the routine flows to 1104 to return to 720 and determine a leg device use case. Otherwise, categorizer 120 determines in 1108 whether the dangling attribute has been assigned. If so, the routine flows to 1104 to return to 720 and determine a dangling device use case. Otherwise, categorizer 120 determines in 1110 whether the arm attribute has been assigned. If so, the routine flows to 1104 to return to 720 and determine an arm device use case. Otherwise, categorizer 120 determines in 1112 whether the pocket attribute has been assigned. If so, the routine flows to 1104 to return to 720 and determine a pocket device use case. When the pocket attribute has not been assigned in 1112, the routine flows to 1104. At this stage, since no attributes have been assigned, it may be desirable to assign the general attribute and return a device use case of general in 720.

Figure 12:
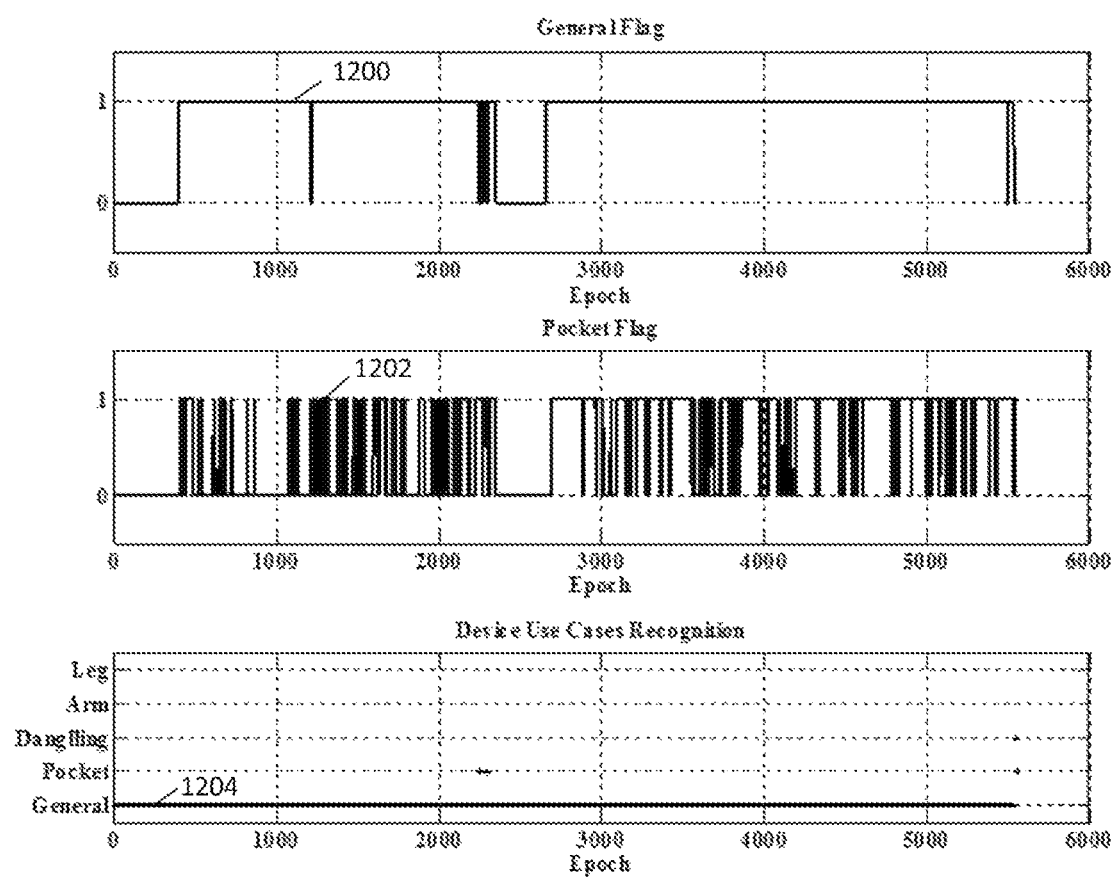
FIG. 12 is a graphical representation of the relationship between use characteristics and a determination of a general device use case for unstable motion according to an embodiment.

A first illustration of an unstable motion routine of 716 is provided in FIG. 12. The top graph shows the status of the general attribute assignment, represented by trace 1200. A value of 1 indicates the attribute has been assigned and a value of 0 indicates the attribute has not been assigned. The middle graph shows the status of the pocket attribute assignment, represented by trace 1202. The bottom graph shows the result of the device use case determination, represented by trace 1204. During periods when the general attribute is assigned, a general device use case is determined when none of the attributes associated with 1102 are assigned as indicated. As such, the status of the pocket attribute assignment does not affect the device use case determination when the general attribute is assigned in this embodiment. During periods when the general attribute is not assigned, it may be seen that the pocket attribute is also not assigned. Accordingly, the determined device use case may also be general under this condition as discussed above.

Figure 13:
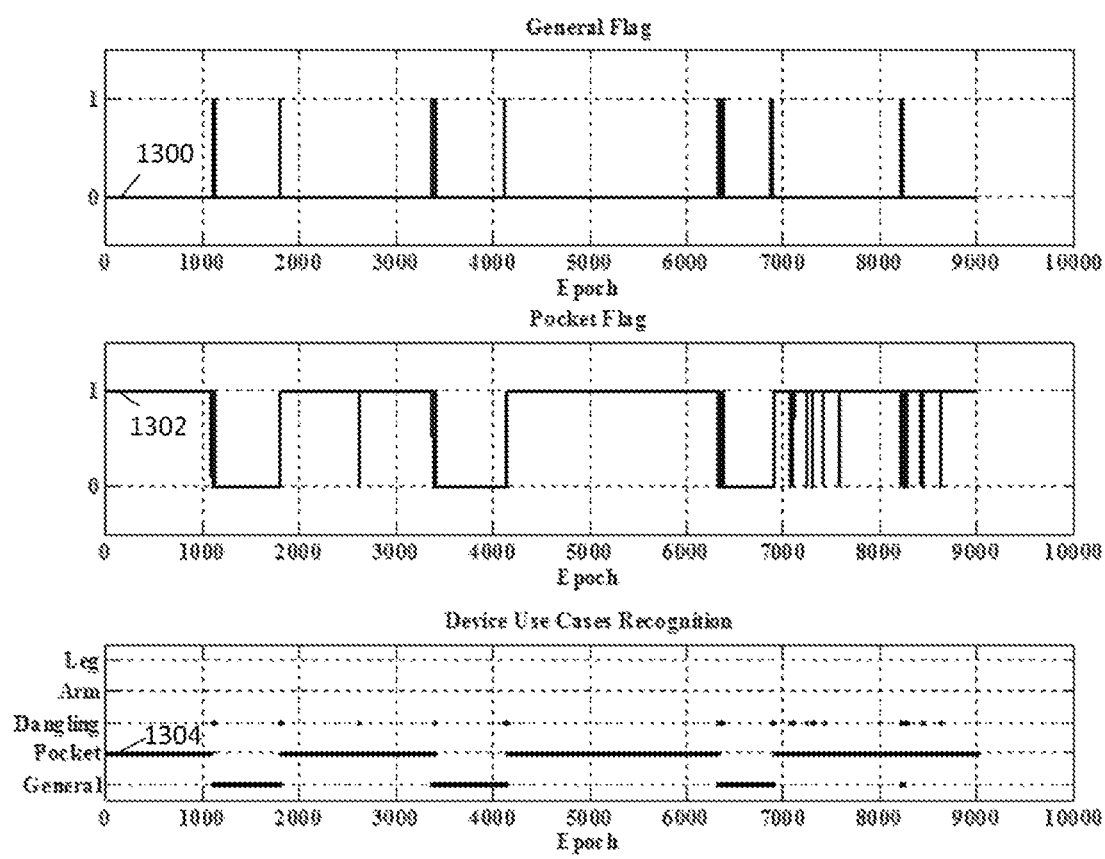
FIG. 13 is a graphical representation of the relationship between use characteristics and a determination of a pocket device use case for unstable motion according to an embodiment

Another illustration of an unstable motion routine of 716 is provided in FIG. 13. Again, the top graph shows the status of the general attribute assignment, represented by trace 1300, the middle graph shows the status of the pocket attribute assignment, represented by trace 1302 and the bottom graph shows the result of the device use case determination, represented by trace 1304. During periods when the general attribute is not assigned and the pocket attribute is not assigned, a general device use case is determined. However, when the general attribute is not assigned, assignment of the pocket attribute returns a pocket device use case determination consistent with 1112.

Figure 14:
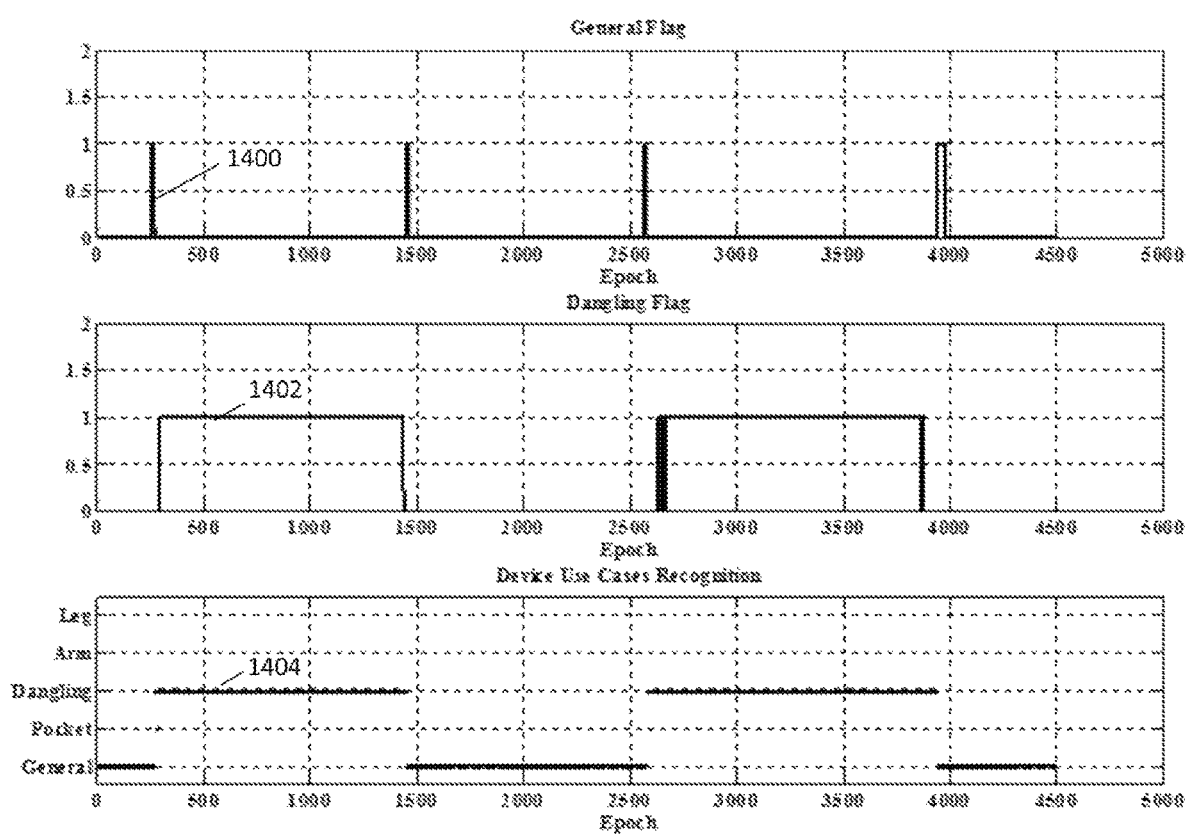
FIG. 14 is a graphical representation of the relationship between use characteristics and a determination of a dangling device use case for unstable motion according to an embodiment.

Yet another illustration of an unstable motion routine of 716 is provided in FIG. 14. Here also, the top graph shows the status of the general attribute assignment, represented by trace 1400, the middle graph shows the status of the dangling attribute assignment, represented by trace 1402 and the bottom graph shows the result of the device use case determination, represented by trace 1404. During periods when the general attribute is not assigned and the dangling attribute is assigned, a dangling device use case is determined.

Figure 15:
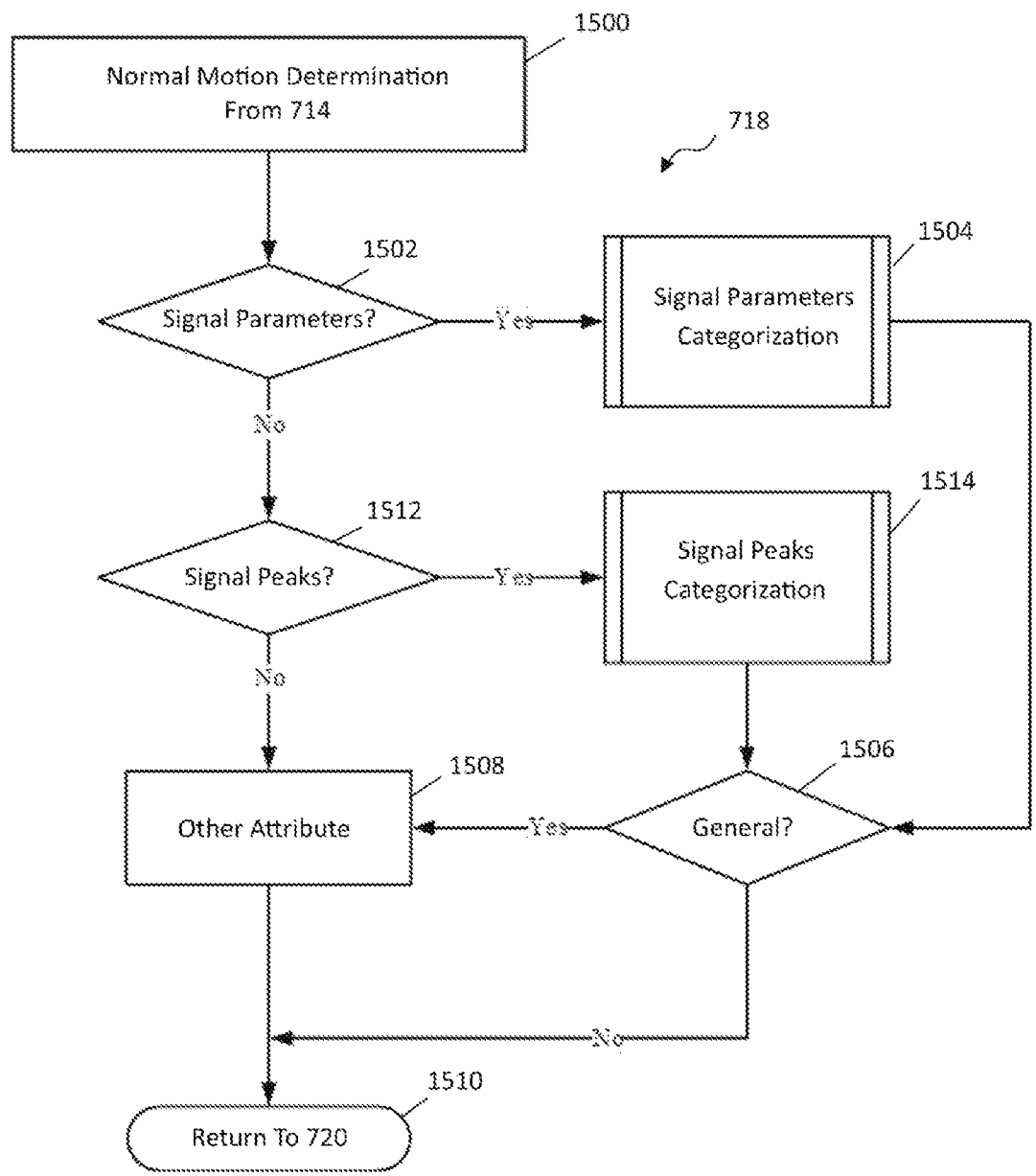
FIG. 15 is a flowchart showing a routine for categorizing device use case under normal motion according to an embodiment.

With regard to FIG. 15, aspects of one embodiment of a normal motion routine are represented by the depicted flow chart. Beginning with 1500, categorizer 120 may first determine whether to employ signal parameters, such as those derived in 700, to determine the device use case. If suitable conditions exist in 1502, as described below, the routine flows to 1504 for making a preliminary device use case determination using the signal parameters. In one embodiment, suitable signal parameters may include a statistical analysis of the processed and/or raw motion sensor data, a statistical analysis of the effective orientation component, the radius of rotation parameters, and/or characteristics of peaks in the processed and/or raw motion sensor data or any combination thereof. Then, in 1506, a determination is made whether the result is a general device use case. If so, the routine flows to 1508 to determine which another attribute has been identified and assigned that may be used to subcategorize the general device use case. For example, following assignment of the general attribute, the determined device use case may depend on whether an attribute such as on ear or belt has also been assigned. Other attributes may be employed as warranted. For example, a general attribute may be employed when other attributes are not assigned. In 1510, the routine returns to 720 for determination of device use case using the other attribute of 1508. When the device use case is not general in 1506, the routine may flow directly to 1510 and return to 720 where determination of the device case may include the result from 1504.

When suitable conditions do not exist for categorizing using signal parameters in 1502, categorizer 120 may then determine in 1512 whether to employ signal peaks for determining the device use case. If so, the routine flows to 1514 for categorization using signal peaks. Following categorization in 1514 the route rejoins the flow at 1506 to follow the operations described above. Similarly, if suitable conditions do not exist for employing signal peaks, the routine rejoins the flow at 1508.

Figure 16:
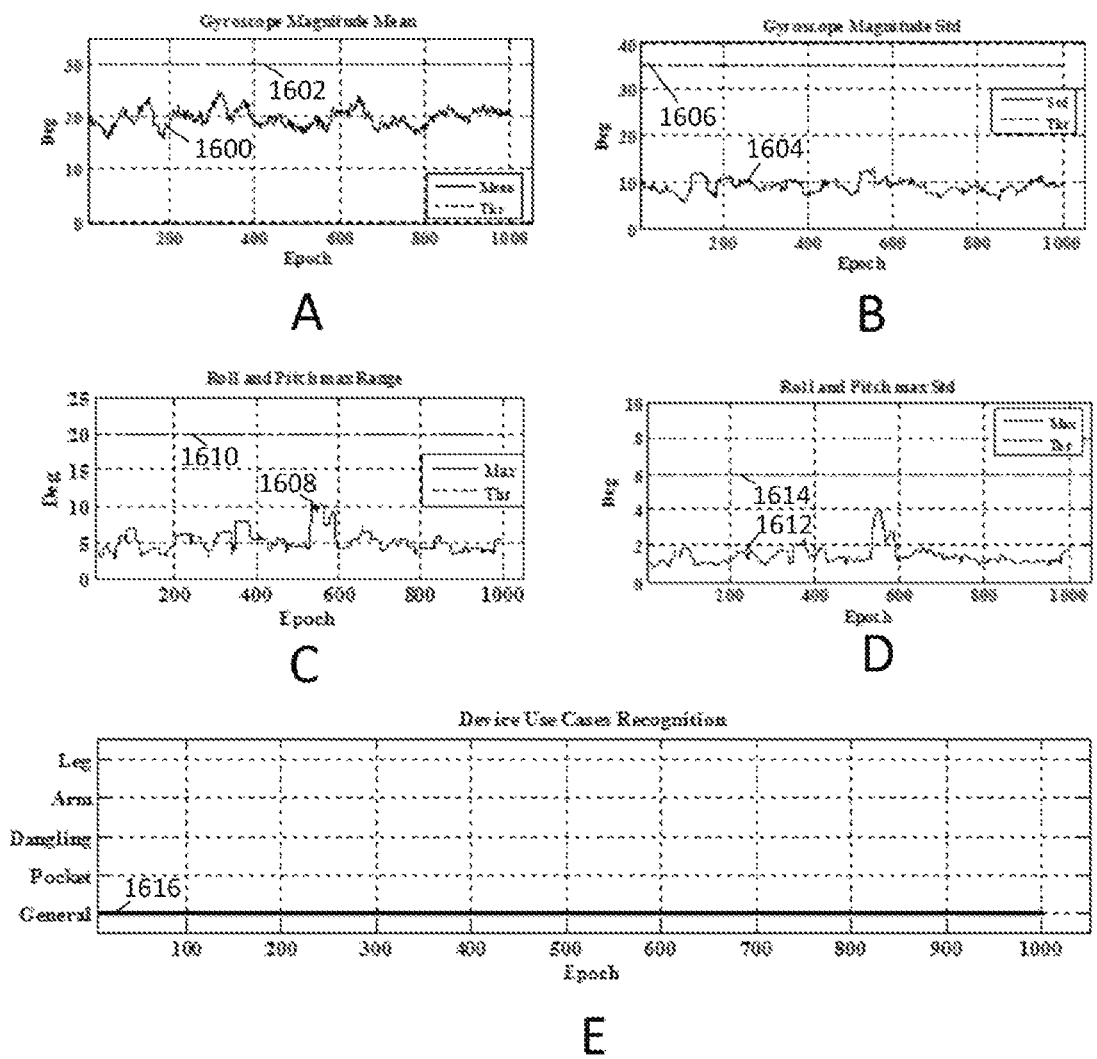
FIG. 16 is a graphical representation of the relationship between use characteristics and a determination of a general device use case for normal motion according to an embodiment.
Figure 17:
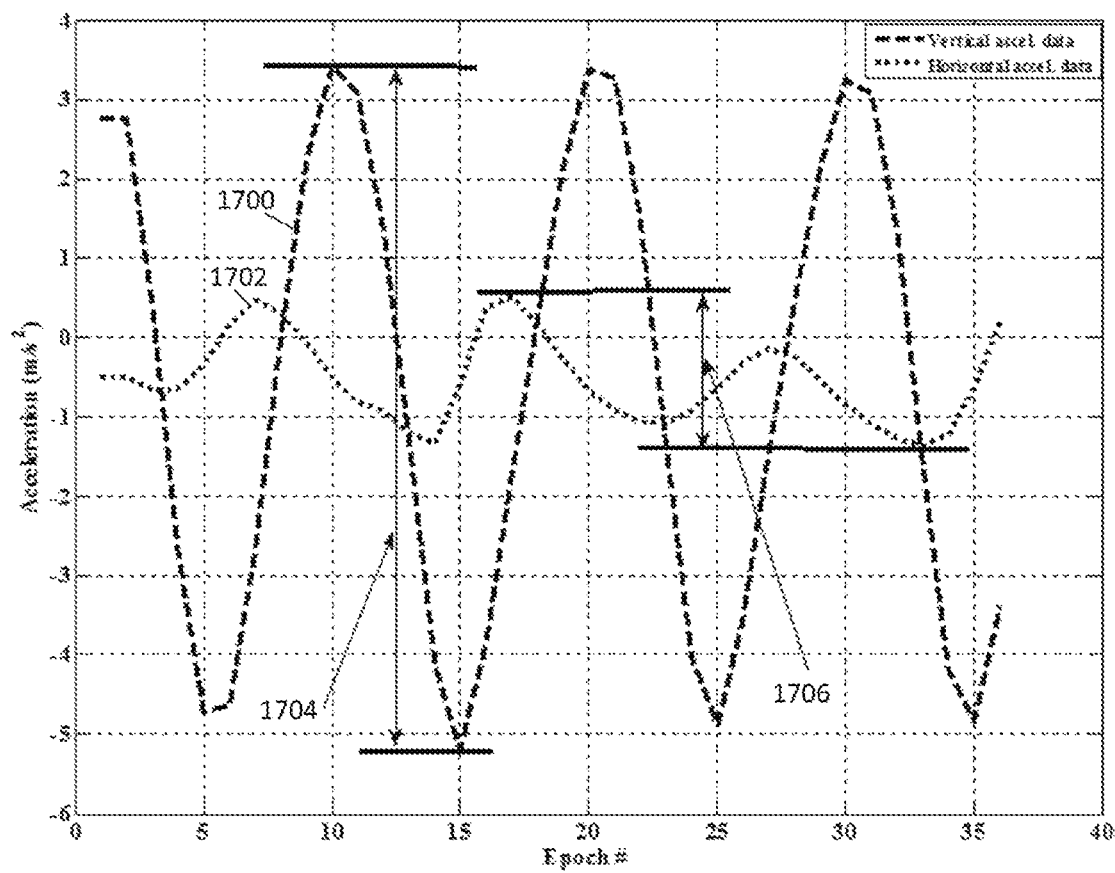
FIG. 17 is a graphical representation of a pattern of use characteristics consistent with an on ear attribute according to an embodiment.

In one aspect, a representative example of categorization using signal parameters as indicated by 1504 is depicted in FIG. 16. The graph of FIG. 16A shows the mean of the gyroscope data magnitude, represented by trace 1600, and the corresponding threshold, represented by trace 1602, while FIG. 16B shows the standard deviation of the gyroscope data magnitude, represented by trace 1604, and the corresponding threshold, represented by trace 1606. Next, the graph in FIG. 16C shows the maximum range value of the roll and pitch angles, represented by trace 1608, and the corresponding threshold, represented by trace 1610, while FIG. 16D shows the maximum standard deviation value of the roll and pitch standard deviation values, represented by trace 1612, and the corresponding threshold, represented by trace 1614. Finally, FIG. 16E shows the result of the device use case determination employing these signal parameters, represented by trace 1616. Here, the gyroscope magnitude mean and standard deviation values and the change in the roll and pitch values are relatively small, resulting in determination of a general device use case as indicated. As noted with regard to 1508, other assigned attributes may be employed to determine on ear, belt or other device use cases. For example, FIG. 17 shows the relationship between the ranges of the vertical acceleration signal, represented by trace 1700, and the horizontal acceleration signal, represented by trace 1702. In particular, the vertical range, represented by trace 1704, is significantly larger than the horizontal range, represented by trace 1706. As described above, this may be used to assign the on ear attribute to this pattern of motion sensor data, so that 1508 returns a determination of an on ear device use case.

Figure 18:
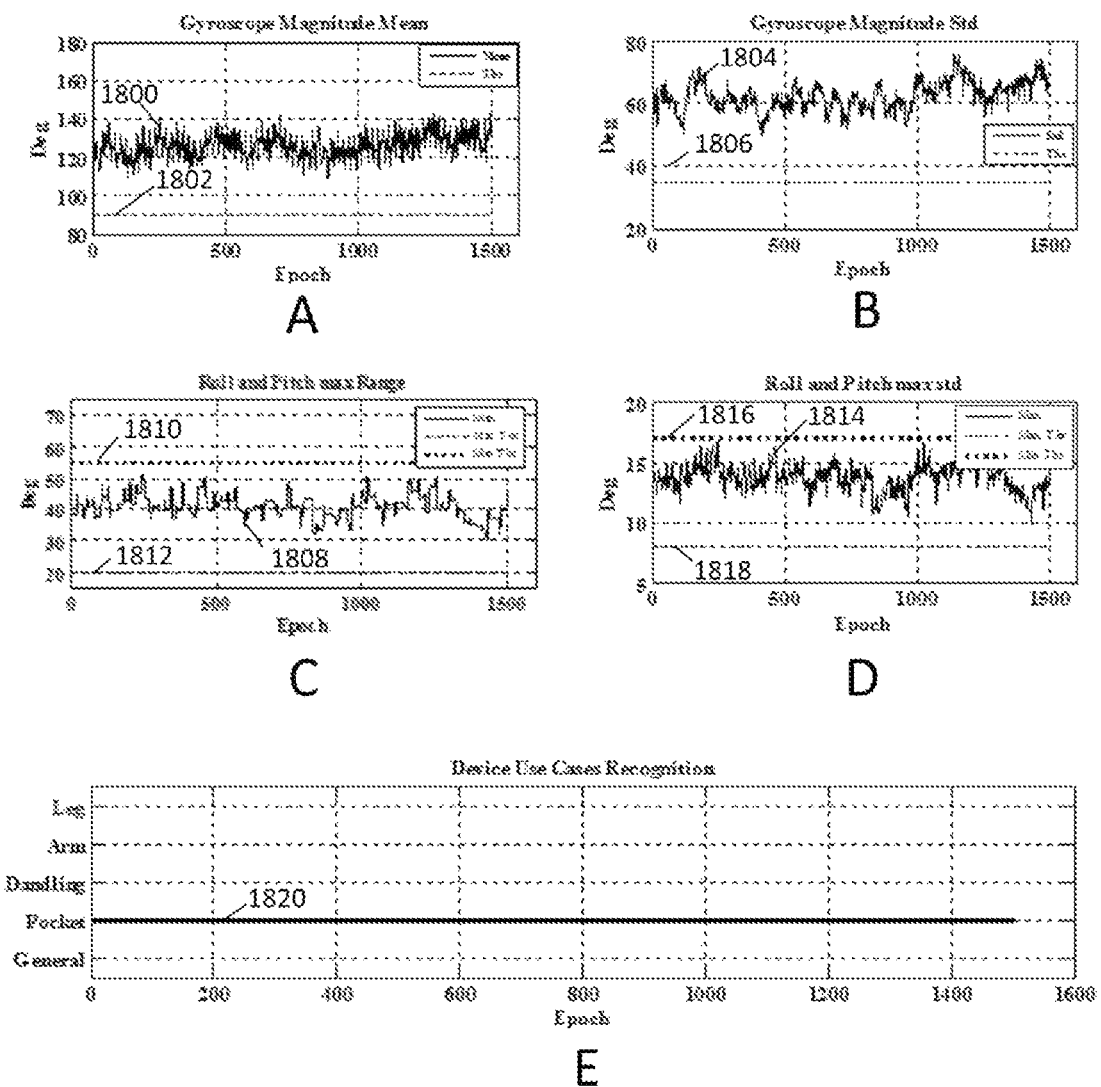
FIG. 18 is a graphical representation of the relationship between use characteristics and a determination of a pocket device use case for normal motion according to an embodiment.

Another example of categorization using signal parameters as indicated by 1504 is depicted in FIG. 18. The graph of FIG. 18A shows the mean of the gyroscope data magnitude, represented by trace 1800, and the corresponding threshold, represented by trace 1802, while FIG. 18B shows the standard deviation of the gyroscope data magnitude, represented by trace 1804, and the corresponding threshold, represented by trace 1806. Next, the graph in FIG. 18C shows the maximum range value of the roll and pitch angles, represented by trace 1808, and the corresponding minimum threshold, represented by trace 1810, and maximum threshold, represented by trace 1812, while FIG. 18D shows the maximum standard deviation value of the roll and pitch standard deviation values, represented by trace 1814, and the corresponding minimum threshold, represented by trace 1816, and maximum threshold, represented by trace 1818. Finally. FIG. 18E shows the result of the device use case determination employing these signal parameters, represented by trace 1820. Here, the gyroscope magnitude mean and standard deviation values are relatively high and the change in the roll pitch values are relatively small, resulting in determination of a pocket device use case as indicated. As noted with regard to 1508, other assigned attributes may be employed to determine on ear, belt or other device use cases.

Figure 19:
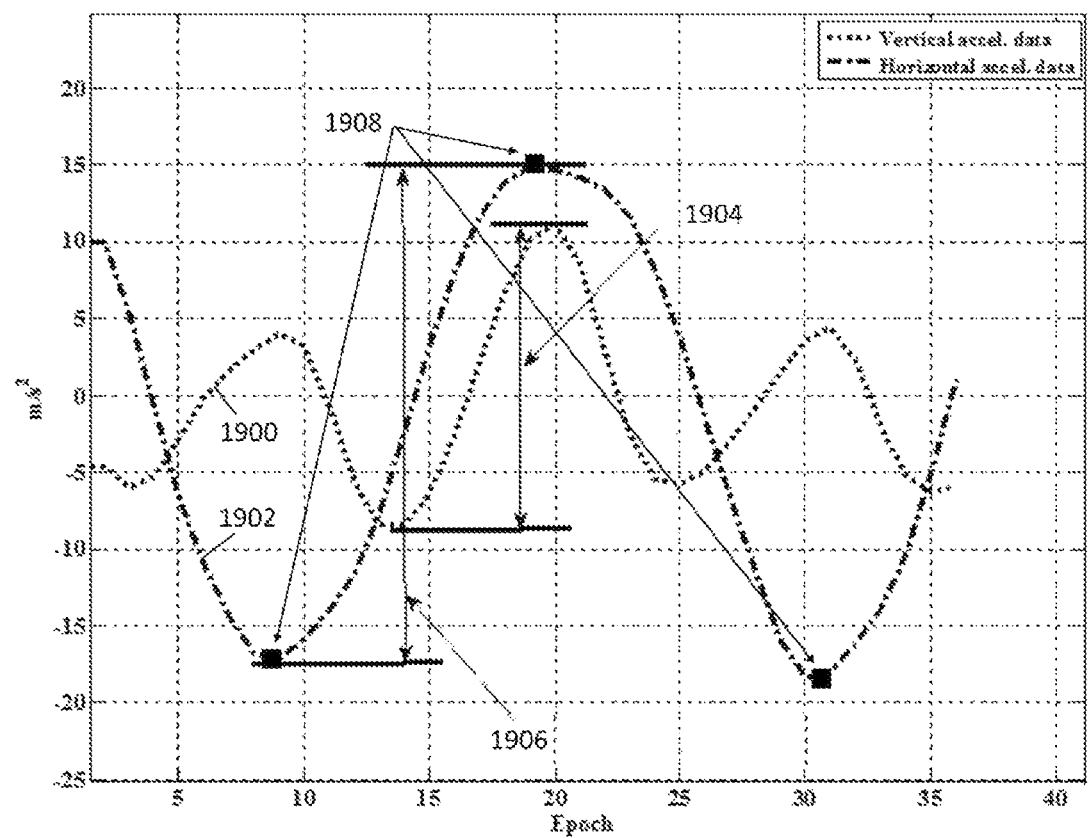
FIG. 19 is a graphical representation of a pattern of use characteristics consistent with a dangling attribute according to an embodiment.

In another representative example, FIG. 19 shows the relationship between the ranges of the vertical acceleration signal, represented by trace 1900, and the horizontal acceleration signal, represented by trace 1902. As shown, the vertical range, represented by trace 1904, is approximately 19 and the horizontal range, represented by trace 1906, is approximately 33. Since the horizontal component indicates greater influence from the user motion, the dangling attribute may be assigned to this pattern of motion sensor data, so that 1508 returns a determination of a dangling device use case. Although not shown, the gyroscope mean and standard deviation and change in roll and pitch values are moderate in this situation with the summation of the horizontal acceleration high and low peaks number less than a certain number, such as for example 5. As indicated by 1908, a total number of three horizontal acceleration peaks may be identified in this example.

As will be appreciated other patterns of signal parameters may also be identified that enable determination of a device use case. However, when no suitable patterns are identified, the routine shown in FIG. 15 may flow to 1512 to determine if categorization using signal peaks may be employed. Depending on the embodiment, different combinations of signal components and parameters may be analyzed with respect to the relationship between their high and low peaks. For example, the effective orientation component, vertical acceleration and horizontal acceleration signals may be used. The relative location of the different peaks to each other may provide an indication of the appropriate device use case, such as by comparing statistical features including mean, standard deviation and range. As described above, different thresholds may be employed to detect useful peaks for this analysis.

Figure 20:
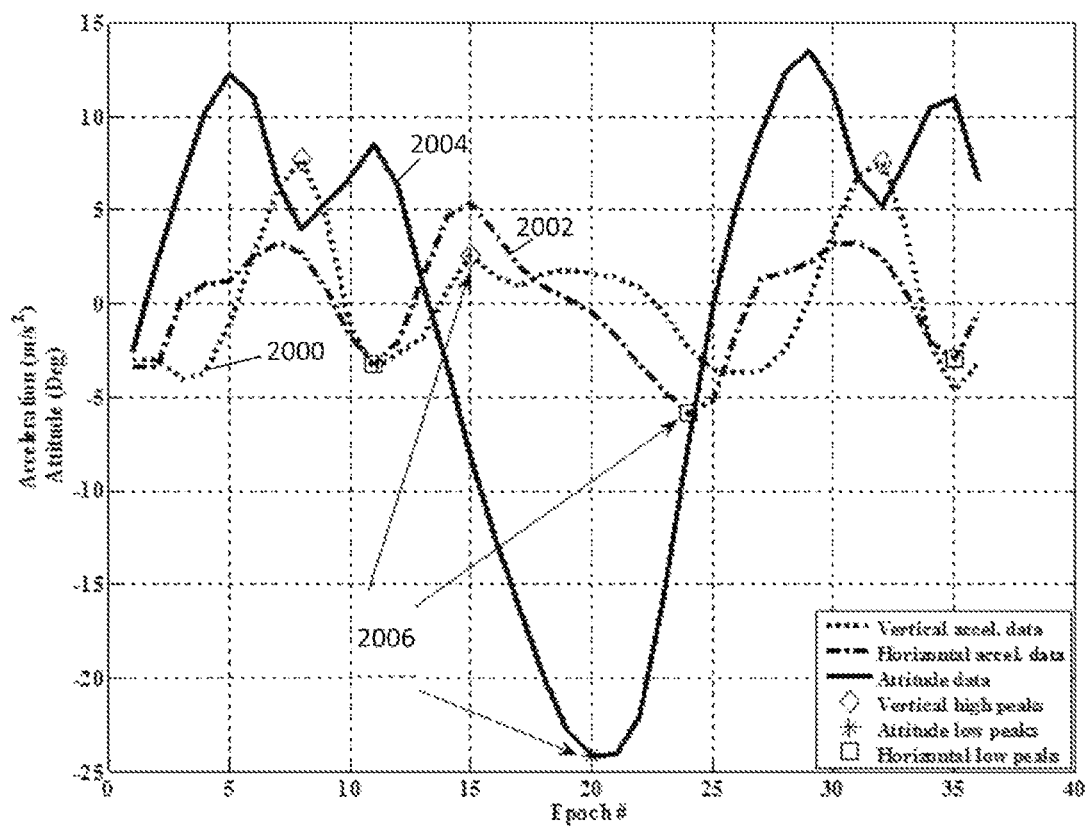
FIG. 20 is a graphical representation of signal peaks consistent with a pocket device use case at normal walking speed according to an embodiment.
Figure 21:
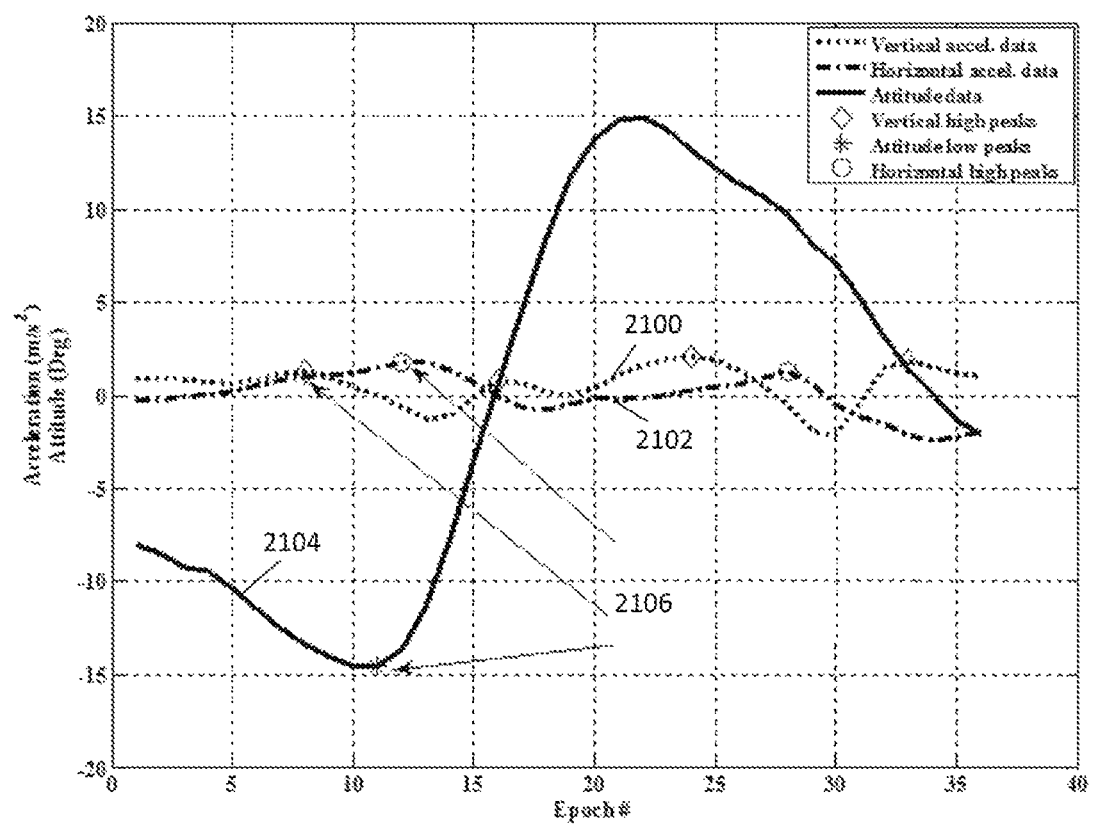
FIG. 21 is a graphical representation of signal peaks consistent with a pocket device use case at slow walking speed according to an embodiment.
Figure 22:
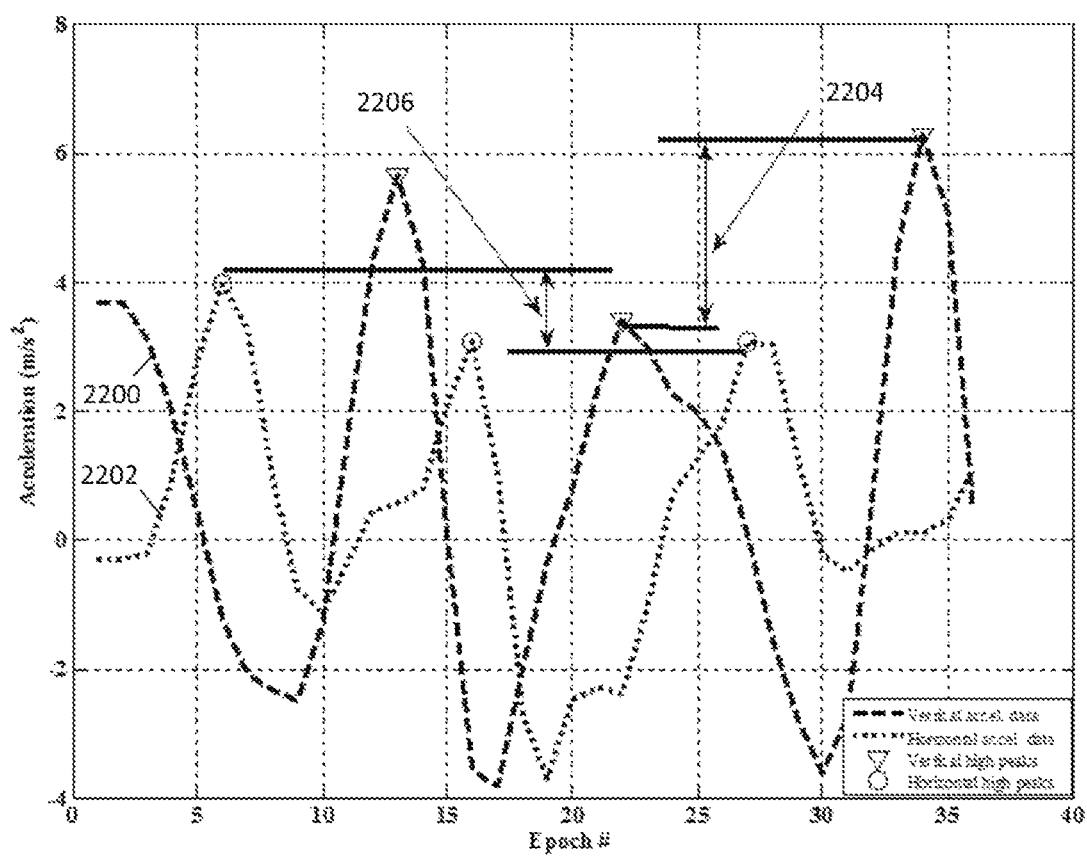
FIG. 22 is a graphical representation of signal peaks consistent with a belt device use case according to an embodiment.

One representative example of categorization using signal peaks as indicated by 1514 is depicted in FIG. 20. As shown, the vertical acceleration signal, represented by trace 2000, the horizontal acceleration signal, represented by trace 2002 and the effective orientation component, represented by trace 2004 feature a combination of high and low peaks. Peak grouping 2006, corresponding to the sequence of a vertical high peak, a horizontal low peak and an effective orientation component low peak may be characteristic of a pocket device use case. In this example, the data was obtained while the user was walking at a normal speed. For comparison, FIG. 21 shows a similar pattern corresponding to a slow walking speed. The vertical acceleration signal, represented by trace 2100, the horizontal acceleration signal, represented by trace 2102 and the effective orientation component, represented by trace 2104 also feature a combination of high and low peaks. Here, peak grouping 2106 corresponds to the sequence of a vertical high peak, an effective orientation component low peak and a horizontal high peak may also be characteristic of a pocket device use case. Another representative example of categorization using signal peaks as indicated by 1514 is depicted in FIG. 22. As shown, the vertical acceleration signal is represented by trace 2200 and the horizontal acceleration signal is represented by trace 2202. Accordingly, ranges between corresponding peaks, such as range 2204 between vertical acceleration signal high peaks and range 2206 between horizontal acceleration signal high peaks may be determined. This pattern features a vertical range 2204 that is greater than the horizontal range 2206 that may be indicative of a belt device use case.

In another aspect, the techniques of this disclosure may include determining a device use case with categorizer 120 based on a determined effective frequency of the processed and/or raw motion sensor data as noted above in reference to 306 of FIG. 3. The effective frequency corresponds to periodic characteristics that may be associated with the motion of the user, such as produced by the user's stride. The effective frequency of the user movement may be calculated in the time domain, the frequency domain or both.

Accordingly, in one embodiment, categorizer 120 (e.g.), may derive the effective frequency in the time domain from the peaks frequency of a signal as described above. The peaks frequency may be calculated using the detected peaks of a signal having periodic characteristics and the summation of the periods, multiplied by the sampling frequency of the corresponding sensor, Sensors_rate, as indicated by Equation (1):

$$\text{Peaks\_freq} = \text{Sensors\_rate} * \left( \frac{(\text{peaks\_num} - 1)}{\sum \text{distance\_between\_peaks}} \right) \quad (1)$$

For example, vertical acceleration and along-track and/or horizontal acceleration peaks frequency may be used. The relationship between vertical acceleration and along-track and/or horizontal acceleration varies depending on the device use case, so identifying a characteristic relationship may allow determination of the device use case. In one embodiment, when the peaks frequency of the vertical acceleration and along-track and/or horizontal acceleration are substantially the same, categorizer 120 may determine a general device use case corresponding to texting, reading, viewing or the like with device 100. In another embodiment, when the peaks frequency of the vertical acceleration is approximately twice the along-track and/or horizontal acceleration categorizer 120 may determine device 100 is in a dangling device use case.

In another embodiment, the effective frequency may be derived in the frequency domain using frequency domain techniques, such as for example the Fast Fourier Transformation (FFT). As will be appreciated, FFT is an algorithm which computes the Discrete Fourier transform (DFT) and the inverse (IDFT) to convert from the time space to frequency space and vice versa. FFT may be used to calculate the user movement frequency in the frequency domain by finding the effective frequency for each signal such as x, y and z leveled accelerations data. As a representative example, the sample window may be approximately two seconds. The corresponding frequency to the maximum amplitude component of x, y, z, and horizontal accelerations data may then be calculated. The frequency with maximum amplitude among the calculated frequencies is then used to determine the motion effective frequency.

In another embodiment, the effective frequency may be derived using the vertical, horizontal, x, and y accelerations peaks frequency and power. The peaks frequency may be calculated in the time domain as described above. While, the signal's power may be calculated using any analytical technique or in frequency domain using for example using the FFT around the peak frequency for each signal. The signals' peaks frequency and power may be used to calculate the user movement frequency (effective frequency). As a representative example, the sample window may be approximately two seconds. The peaks frequency for each signal is calculated. Then, the data is transformed to the frequency domain using FFT around the calculated peaks frequency for each signal. The corresponding frequency to the maximum amplitude component of x, y, z, and horizontal accelerations data may then be calculated. The corresponding peaks frequency to the maximum amplitude among the calculated amplitudes is then used to determine the motion effective frequency.

Figure 23:
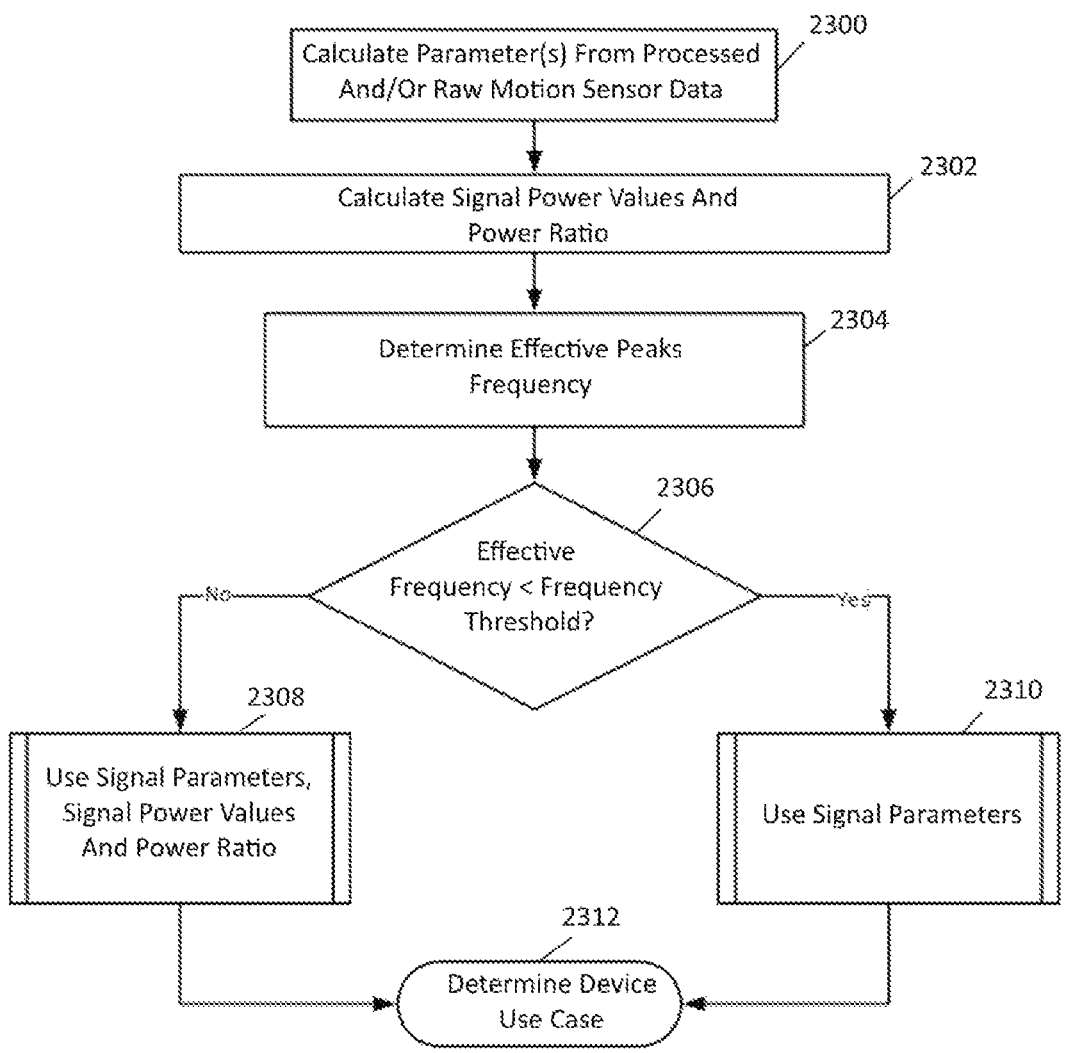
FIG. 23 is a flowchart showing a routine for categorizing device use case using effective frequency according to an embodiment.

To help illustrate, a suitable routine for determining a device use case using effective peaks frequency is depicted in the flow chart of FIG. 23. As shown, beginning with 2300 this may include calculating one or more parameters for the processed motion sensor data from 302 and/or the raw motion sensor data from 300 of FIG. 3, such as the mean, standard deviation, range, variation, or other suitable parameters, either as described above or otherwise within the scope of this disclosure. For example, parameters may be calculated for horizontal and vertical acceleration, radius of rotation, and magnitude of gyroscope data. In 2302, signal power values and power ratio may be calculated for desired components of the processed or raw motion sensor data, such as the horizontal and vertical acceleration signals. For example, an FFT operation may be performed. Next, in 2304 these calculations may be used to determine the effective frequency. At 2308, the routine may branch depending on whether the determined effective peaks frequency exceeds a frequency threshold. If so, the routine flows to 2308 and the signal parameters from 2300 along with the signal power values and power ratio from 2302 may be used to distinguish between a pocket device use case and a general use case. If the effective frequency is below the threshold, the routine flow instead to 2310 and the signal parameters from 2300 may be used to distinguish between arm, leg and dangling device use cases. Depending upon the results from 2308 or 2310, the routine may then determine a device use case in 2312.

As noted, the raw data, the leveled horizontal and vertical acceleration data and the gyroscopes data may be used when making the device use case determination. The value of the effective frequency with respect to the frequency threshold may be used to group the different device use cases into two groups. The first group may include arm, dangling, and leg where the value of the effective frequency is less than the threshold. The other use cases that have larger frequency than the threshold may comprise a second group, and may include the general and pocket device use cases. To differentiate between the different device use cases in each group, the signal power and strength, along with different signal parameters such as the signal ranges and standard deviations may be used.

In another aspect, the techniques of this disclosure may include determining a device use case with categorizer 120 based on a determined Eigen use case of the processed and/or raw motion sensor data as noted above in reference to 308 of FIG. 3. Device use case datasets may transformed and projected into a low dimensional space to facilitate recognition by defining Eigen use cases. The process is somewhat similar to representing a periodic signal as a sum of more basic oscillating functions. Eigen use cases refer to a set of eigenvectors to be use used in the device use case determination. These Eigen use cases are derived from the covariance matrix of the probability distribution of the high-dimensional vector space of possible device use cases data from the sensors' measurements.

Figure 24:
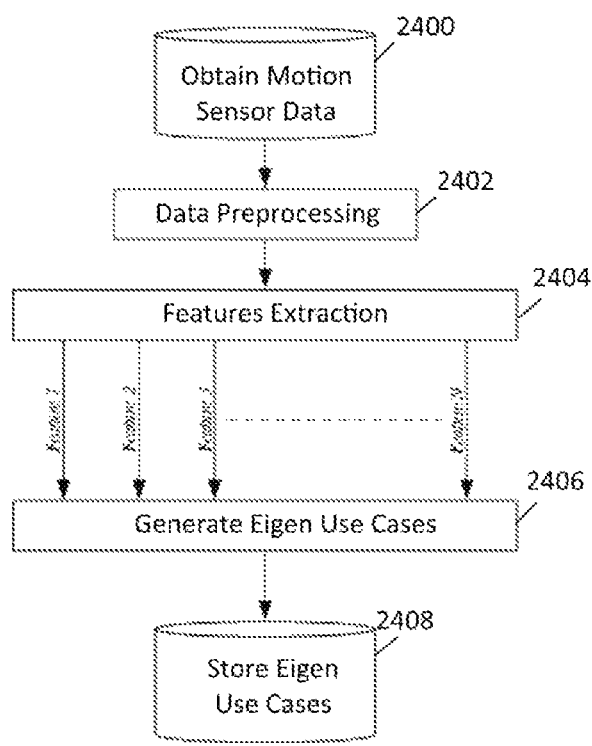
FIG. 24 is a flowchart showing a routine for generating and storing Eigen use cases corresponding to device use cases according to an embodiment.

An example of the training phase used to generate the Eigen use cases is depicted in FIG. 24. Beginning with 2400, sets of motion sensor data associated with a corresponding device use case may be obtained from suitable sources, such as device 100. The motion sensor data may be preprocessed as warranted in 2402. In 2404, multiple features, such as features 1, 2, . . . , n, may be extracted from the processed and/or raw motion sensor data. Using the extracted features, an Eigen use case may be generated for each desired device use case in 2406. These Eigen use cases are then stored in 2408 for later use in categorizing used to create the corresponding Eigen use case.

Figure 25:
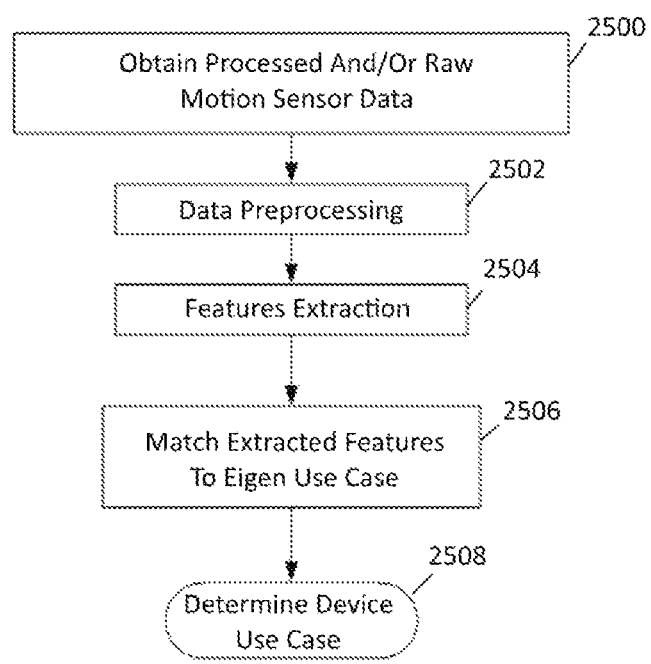
FIG. 25 is a flowchart showing a routine for categorizing device use case using Eigen use cases according to an embodiment.

Correspondingly, an example of using the generated Eigen use cases to determine a device use case is depicted in FIG. 25. Beginning with 2500, motion sensor data from device 100, such as processed motion sensor data from 302 and/or raw motion sensor data from 300 of FIG. 3 may be obtained. Next, 2502 and 2504 may be similar to the corresponding stages of Eigen use case generation to pre-process the data and extract features. The extracted features may then be matched to one of the stored Eigen use case in 2506. The device use case may be determined in 2508 based on which Eigen use case matched the extracted features. Further, each device use case to be classified may represent a combination of Eigen use cases, such that the Eigen use-cases may be considered as a characteristic features of the device use cases. Thus, each device use case may be recognized using Eigen use-cases when all the Eigen use-cases are combined in the appropriate proportion. Thus, each Eigen use-case represents only a certain group of features of each device use case, which may or may not be present in a given device use case being determined.

As described above, the categorization of device use case may involve one or more use case characteristics derived from the processed and/or raw motion sensor data, an effective frequency identified in the processed and/or raw motion sensor data and/or an Eigen use case determined from the processed and/or raw motion sensor data. To help illustrate these concepts, additional representative examples are provided in the following materials to indicate the use of roll and pitch values when categorizing device use cases.

In one test scenario, several data sets were collected using a portable device, such as device 100, in various device use cases while the user walked or ran at different speeds. During collection of the data, the user switched between the different use cases, such as by placing and removing the device in a pocket and securing the device and releasing it from a belt clip.

Figure 26:
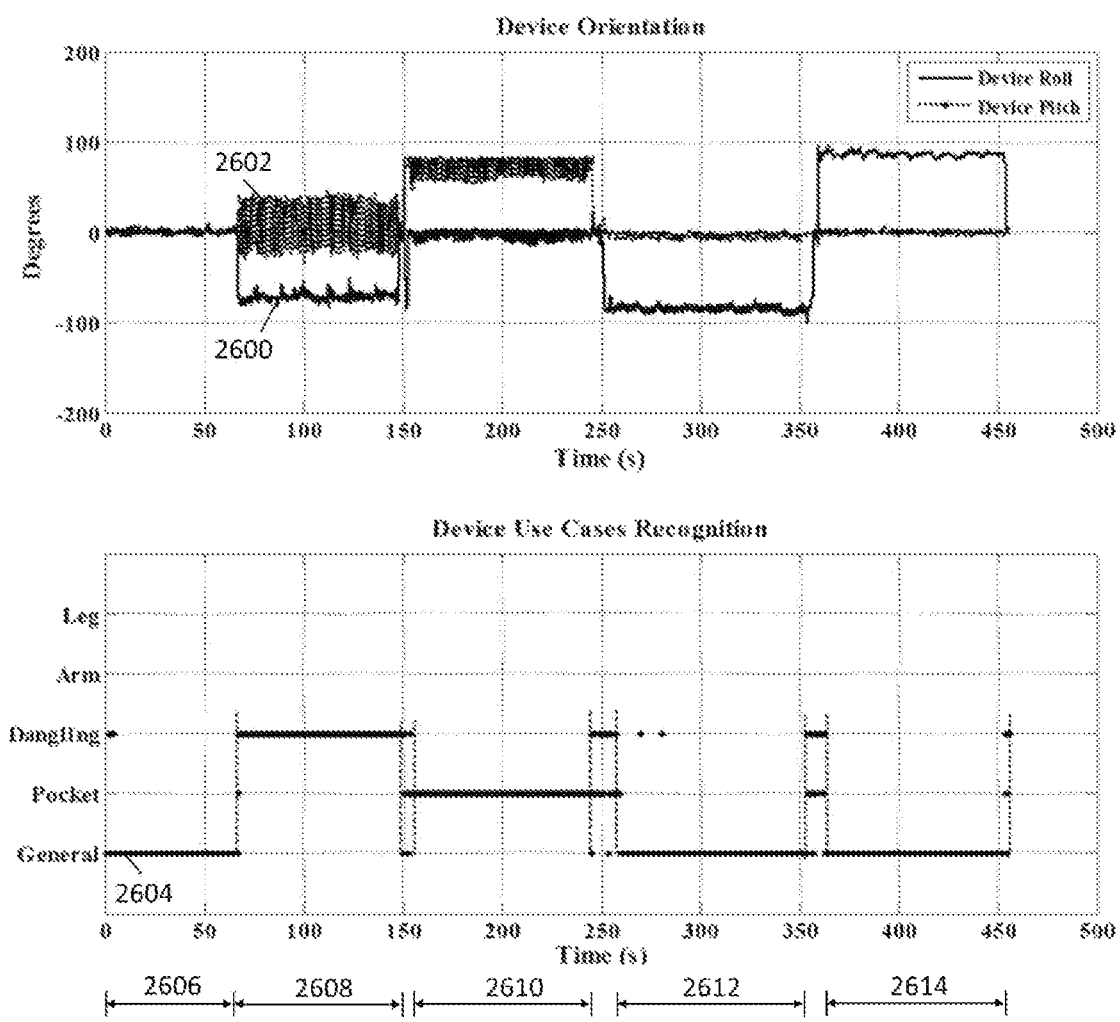
FIG. 26 is a graphical representation of the relationship between use characteristics and determination of a first sequence of device use cases when walking according to an embodiment.

As one example, FIG. 26 illustrates the orientation of device 100 during a sequence of device use cases including general (texting), dangling, pocket, general (belt) and then general (ear talking) while the user walked at a normal speed. The top graph shows the device orientation as roll, represented by trace 2600, and pitch, represented by trace 2602, over time. The bottom graph shows the resulting device use case categorizations, represented by trace 2604. These graphs indicate the device use case was determined to be general for intervals 2606, 2612 and 2614, to be dangling for interval 2608 and to be pocket for 2610. The general, dangling and pocket device use cases may be distinguished as described above, or with other suitable modifications. Subcategorization of the general device use case may involve consideration of the device orientation as shown in addition to attributes that may have been assigned. During interval 2606, the user was texting with device 100, and it may be seen that the roll and pitch values were approximately zero as the user was holding device 100 relatively consistently in the horizontal plane. During interval 2608, device 100 held in a swinging hand in a dangling device use case with roll of −90° and varying pitch value. During interval 2610, the device was held in the user's pocket with the screen facing the user's body and the speaker pointed to the up direction. Further, the variation in roll and/or pitch values in the dangling and pocket device use cases may result from the movement of the body part with which the device is associated. During interval 2612, device has been moved into the belt clip with roll value of −90° and during interval 2614, the on ear device use case corresponds to a roll value of 90°. Any gaps between the depicted intervals may be due to the transitions between the classified device use cases, such as the manipulations required to remove device 100 from a pocket and secure it to a belt clip.

Figure 27:
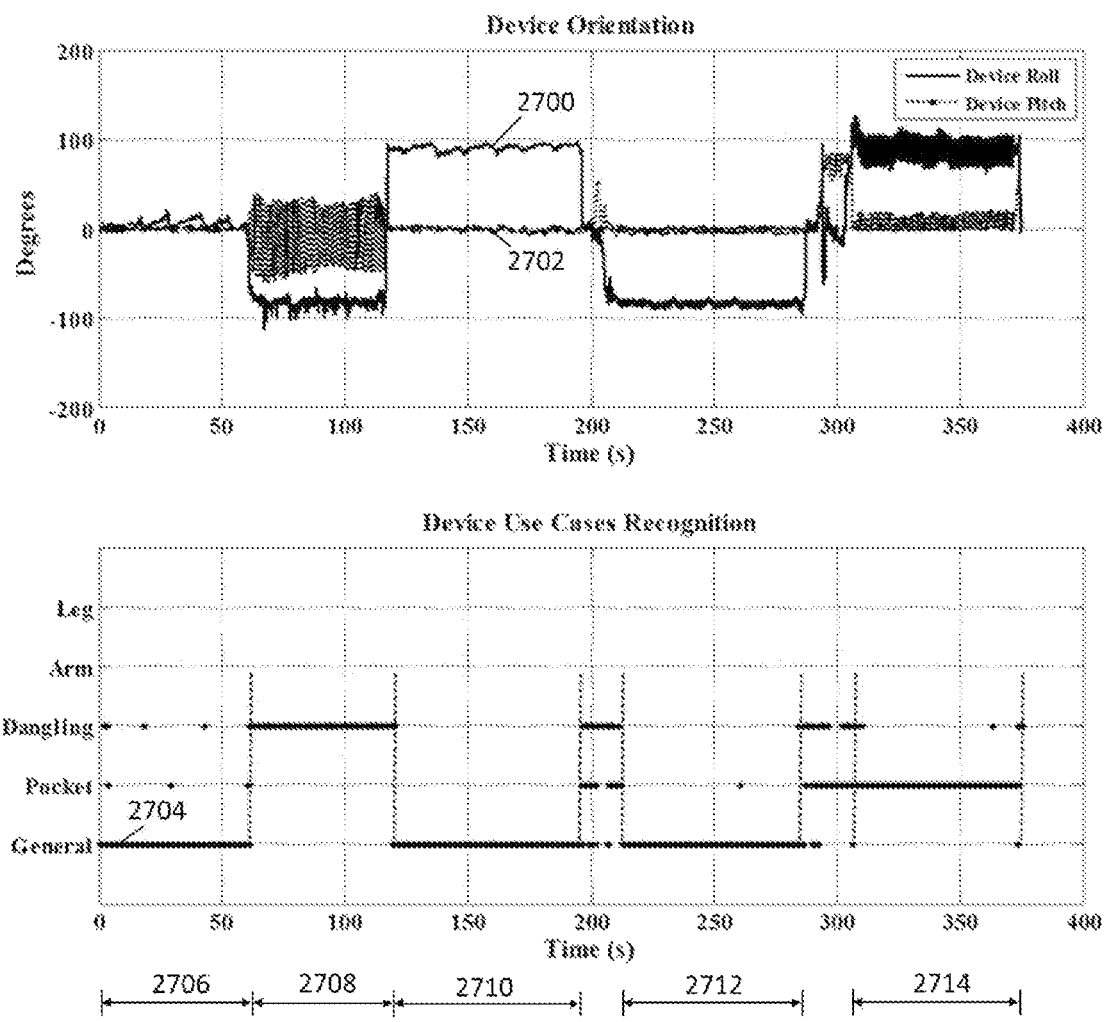
FIG. 27 is a graphical representation of the relationship between use characteristics and determination of a second sequence of device use cases when walking according to an embodiment.
Figure 28:
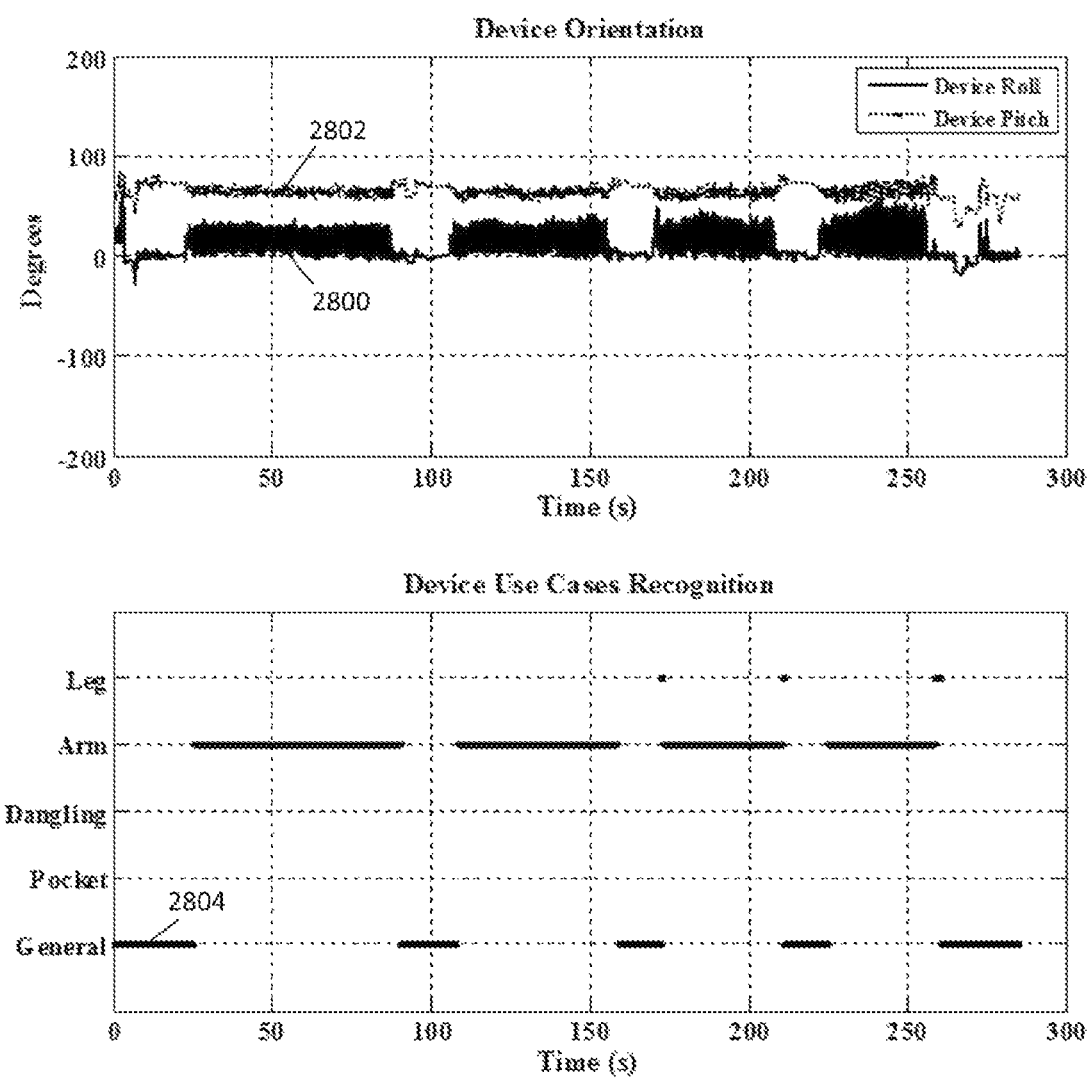
FIG. 28 is a graphical representation of the relationship between use characteristics and determination of an arm device use case when running at different speeds according to an embodiment.

A further illustration of these aspects is shown in FIG. 27, showing a different sequence of device use cases including general (texting), dangling, general (ear talking), general (belt) and pocket device use cases. Again, the top graph shows the device orientation as roll, represented by trace 2700, and pitch, represented by trace 2702, over time. The bottom graph shows the resulting device use case categorizations, represented by trace 2704. These graphs indicate the device use case was determined to be general for intervals 2706, 2710 and 2712, to be dangling for interval 2710 and to be pocket for 2714. Similarly, the orientation of device 100 may be used to subcategorize the general device use cases. While texting during interval 2706, the roll and pitch values were again approximately zero and while dangling during interval 2708, the roll was approximately −90° with varying pitch value. Also similarly, moving device 100 to an on ear device use case in interval 2710 the orientation was consistent with a roll value of approximately 90° and during interval 2712, a belt device use case may be determined based on the roll value of approximately −90° and the pitch value of approximately 0°. In this example, device 100 during interval 2714 was in a pocket device use case, with the pitch value approximately 0° and the roll value approximately 90°, corresponding to the screen was facing the left side of the user's body Next, the examples shown in FIGS. 28-32 show differing device use cases as the user transitions between being stationary and running at increasing speeds. In FIG. 28, device 100 is in an arm device use case, such that the top graph shows the device orientation as roll, represented by trace 2800, and pitch, represented by trace 2802, and the bottom graph shows the resulting device use case categorizations, represented by trace 2804. Device 100 was attached in the vertical direction to the left arm with the speaker up, resulting in pitch angle values of approximately 90° with an average roll angle value of approximately 10° a range increasing with speed up to approximately 30°, resulting from the movement of the user's arm. As can be seen, during stationary periods between the running intervals, the device use case may be determined to be a general device use case as there is no associated arm movement. In one aspect, it may be desirable to maintain an arm device use case categorization during such periods, which may be corroborated by velocity data. This also applies to the general device use case determinations when stationary in the following examples.

Figure 29:
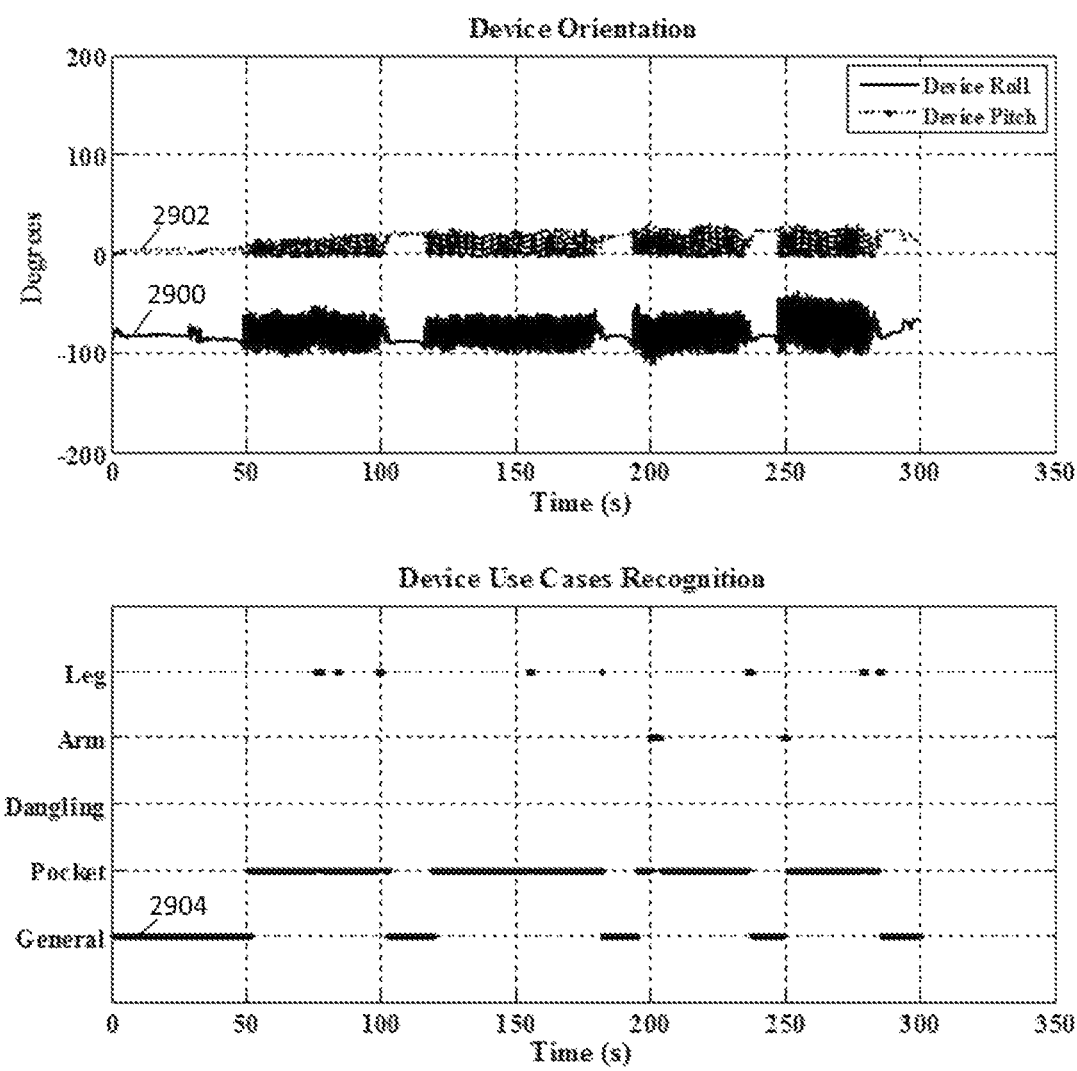
FIG. 29 is a graphical representation of the relationship between use characteristics and determination of a pocket device use case when running at different speeds according to an embodiment.
Figure 30:
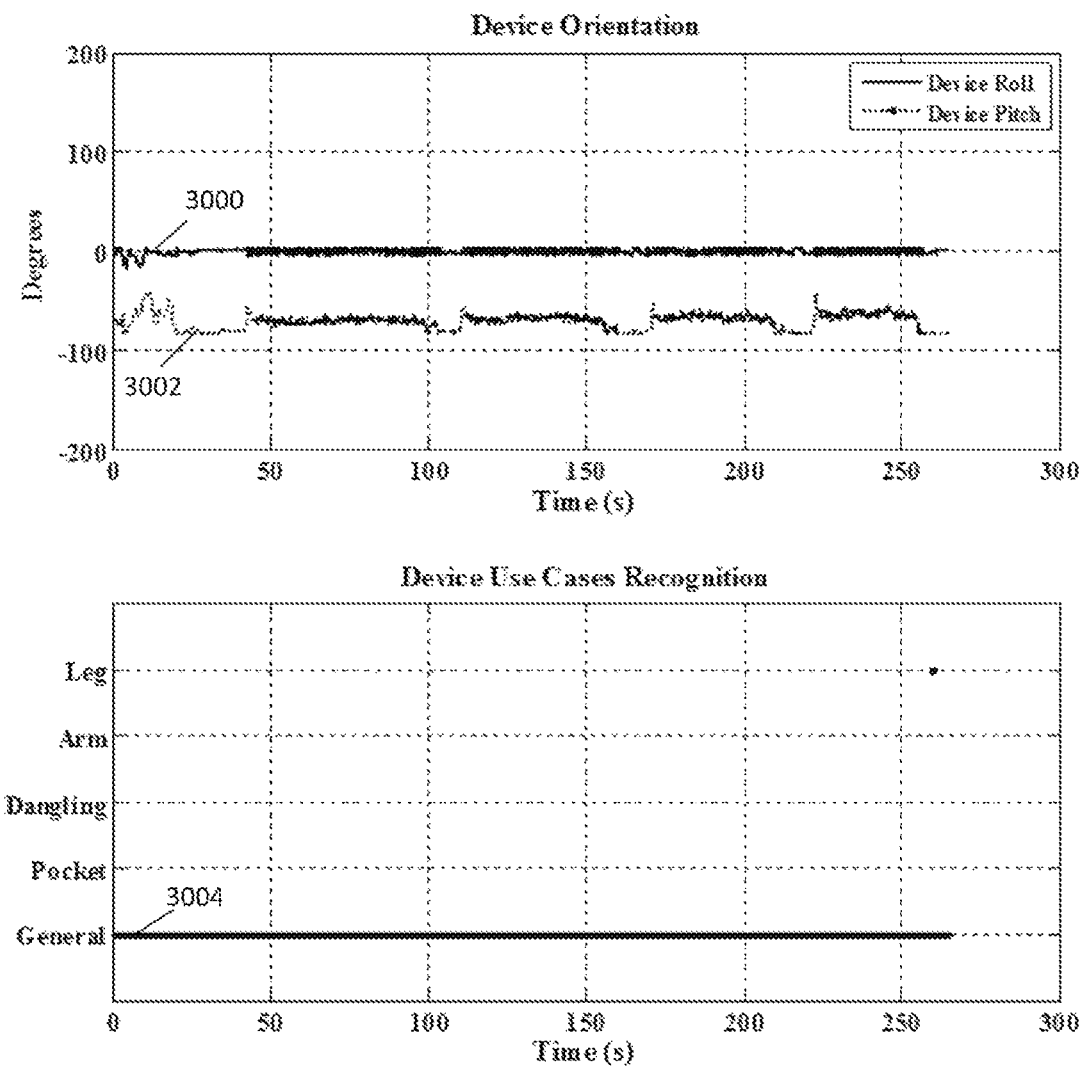
FIG. 30 is a graphical representation of the relationship between use characteristics and determination of a chest device use case when running at different speeds according to an embodiment.
Figure 31:
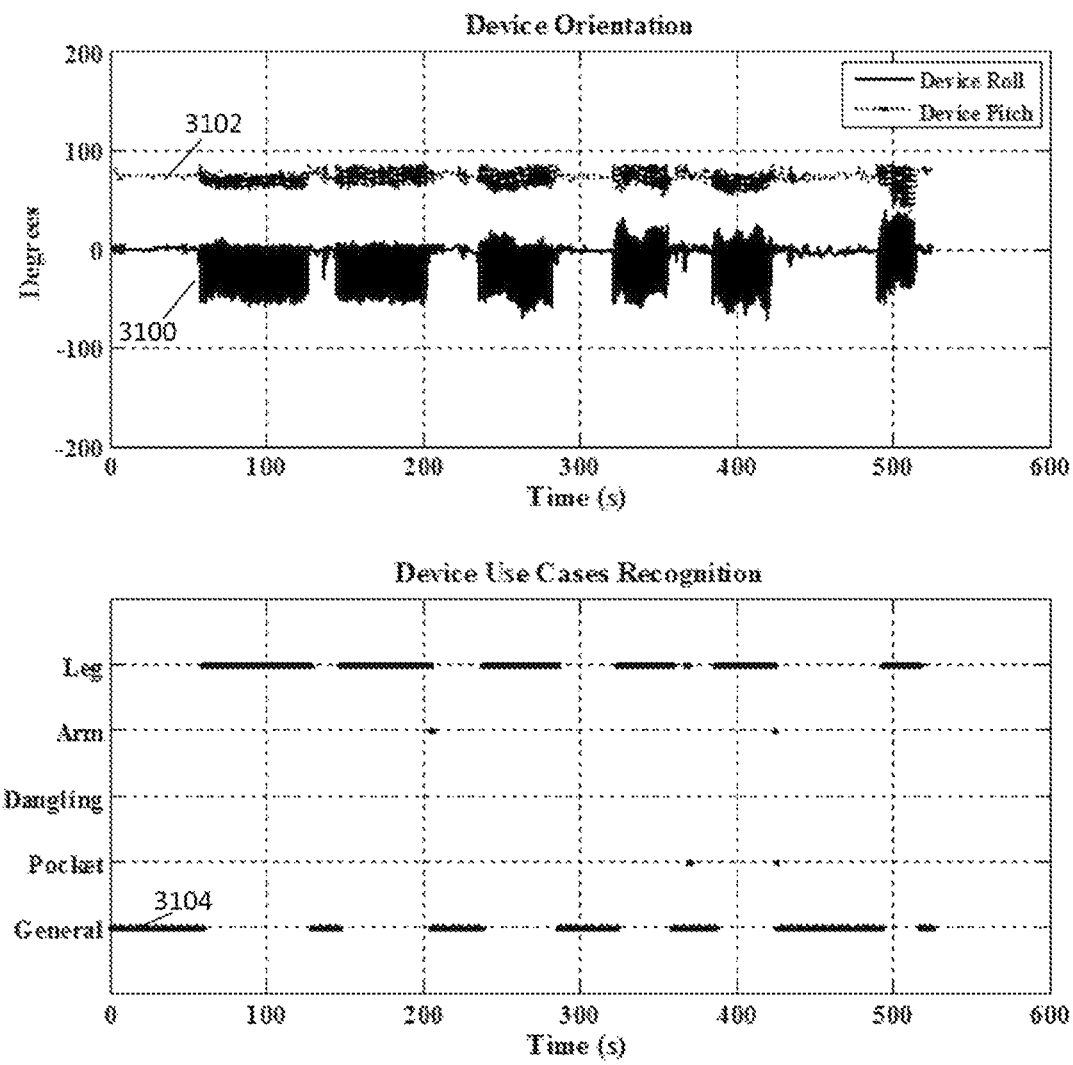
FIG. 31 is a graphical representation of the relationship between use characteristics and determination of a leg device use case when running at different speeds according to an embodiment.

In the example shown in FIG. 29, device 100 is in a pocket device use case, such that the top graph shows the device orientation as roll, represented by trace 2900, and pitch, represented by trace 2902, and the bottom graph shows the resulting device use case categorizations, represented by trace 2904. Device 100 was carried in a front pant pocket with the speaker to the right hand side and the screen facing outward from the user's body. The pitch angle values were approximately 10° while the roll angle values were approximately −90°, again with increasing range at correspondingly greater user speeds, up to approximately 40°. In FIG. 30, device 100 is in a chest device use case, such that the top graph shows the device orientation as roll, represented by trace 3000, and pitch, represented by trace 3002, and the bottom graph shows the resulting device use case categorizations, represented by trace 3004. Device 100 was mounted to the user's chest with the speaker down. The pitch angle values are approximately −90° while the roll angle values are approximately 0°. Here, although the range of both pitch and roll increase with speed, both orientations are relatively consistent reflecting the minimal impact of other body parts of the user on device 100. Yet another example is shown in FIG. 31, with device 100 in a leg device use case, such that the top graph shows the device orientation as roll, represented by trace 3100, and pitch, represented by trace 3102, and the bottom graph shows the resulting device use case categorizations, represented by trace 3104. Device 100 was secured to the right leg with the speaker up. The pitch angle values are approximately 90°, with an average roll angle value of approximately 0° with a range of up to approximately 50° that increases with user speed as in the other examples. Similarly, stationary periods may be identified by the corresponding lack of variation in the roll and pitch values.

Figure 32:
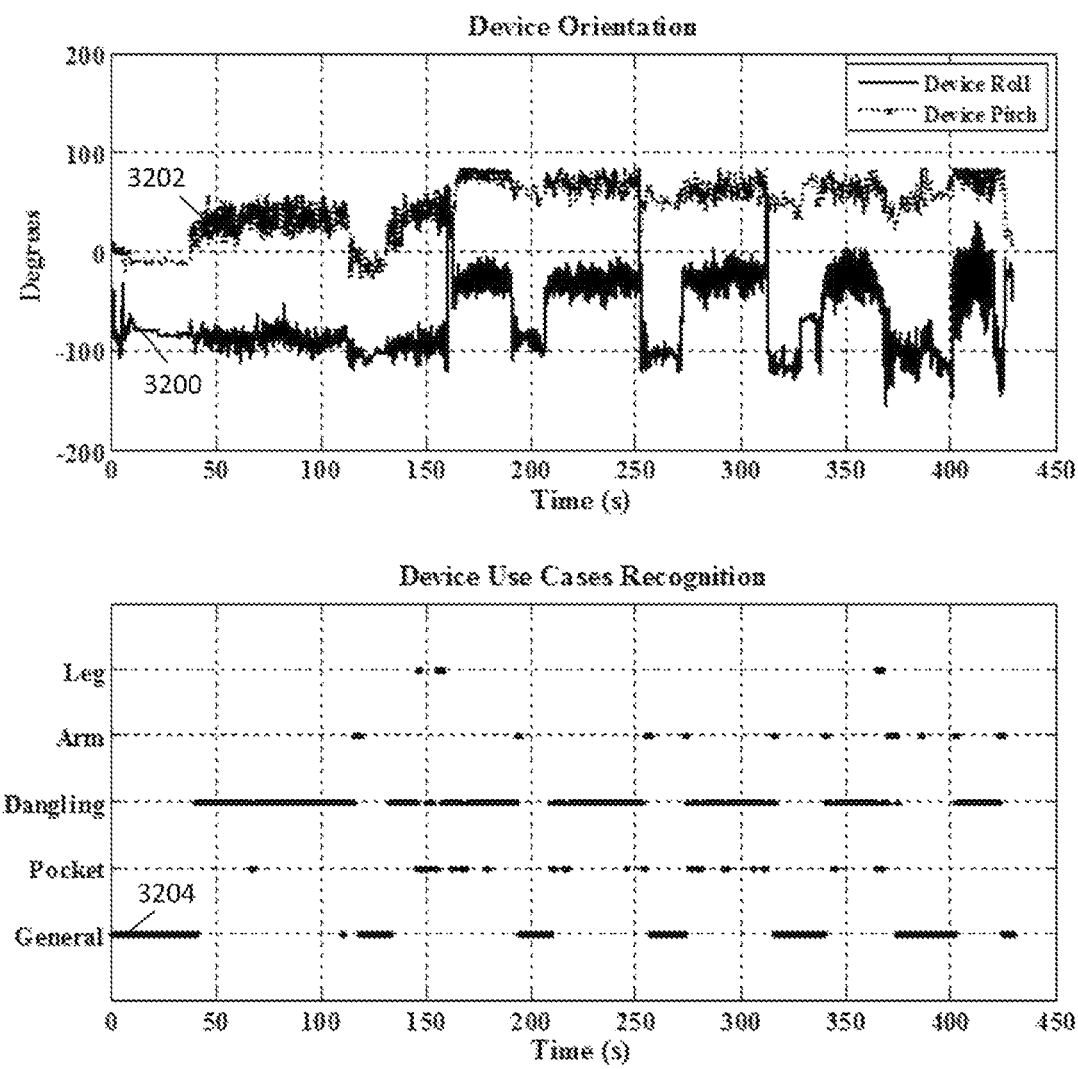
FIG. 32 is a graphical representation of the relationship between use characteristics and determination of a dangling device use case when running at different speeds according to an embodiment.

A last example shown in FIG. 32 corresponds to a dangling device use case. The top graph shows the device orientation as roll, represented by trace 3200, and pitch, represented by trace 3202, and the bottom graph shows the resulting device use case categorizations, represented by trace 3204. Here, device 100 was held in the right hand with the speaker to the forward direction and the screen facing out of the user's hand. The pitch angle values are approximately 70° and the roll angle values are approximately 0° with 10° of range variation. As the user is running and the hand that carries the device is moving, there is a significant variation in the orientation component, which reflects the different ways of holding device 100. For example, the pitch angle may vary primarily if the user is holding the device with the speaker in the forward direction while the roll angle may vary primarily if the user is holding the device with the speaker up. Due to the relatively greater amounts of additional motion and the ability of the user to move the device independent of the overall motion in the direction of travel, the determined device use case may fluctuate relatively rapidly and/or multiple device use cases may be returned. As desired, suitable filtering or averaging techniques may be used to return a more consistent categorization.

Depending on the architecture of device 100, sensor processor 108 and inertial sensor 112 may be formed on different chips, or as shown, may reside on the same chip. A sensor fusion algorithm employed to calculate the orientation of device 100 may be performed externally to sensor processor 108 and MPU 106, such as by host processor 104, or may be performed by MPU 106. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits.

One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The techniques of this disclosure may be combined with any navigation solution independent of the type of the state estimation or filtering technique used in this navigation solution. The state estimation technique can be linear, non-linear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for categorizing a device use case for on foot motion of a user with a portable device comprising:
    (a) obtaining motion sensor data corresponding to motion of the portable device from a sensor assembly integrated with the portable device, wherein the motion sensor data comprises measurements output by a motion sensor;
    (b) performing at least one of:
        (i) deriving a use case characteristic from the motion sensor data, wherein the use case characteristic relates to a type of interaction between the portable device and the user;
        (ii) determining an effective frequency from the motion sensor data; and
        (iii) determining an Eigen use case; and
    (c) categorizing the device use case of the portable device using the motion sensor data and at least one of the derived use case characteristic, the effective frequency and the Eigen use case, wherein the device use case comprises a type of interaction between the portable device and the user, and wherein categorizing the device use case of the portable device is based on at least two of the following:
        (i) a statistical analysis of an effective orientation component, wherein orientation is three dimensional and wherein the effective orientation component is a component of orientation that is more affected by the on foot motion of the user than other components of orientation;
        (ii) calculating a radius of rotation value;
        (iii) detecting a pattern of peaks in the motion sensor data; and
        (iv) calculating a range of peaks in the motion sensor data.

2. The method of claim 1, further comprising processing the motion sensor data.

3. The method of claim 2, wherein processing the motion sensor data comprises transforming the motion sensor data at least in part with a determined orientation of the portable device.

4. The method of claim 3, wherein processing the motion sensor data characterizes vertical acceleration by leveling accelerometer data using the determined orientation of the portable device.

5. The method of claim 4, wherein processing the motion sensor data to characterize vertical acceleration further comprises subtracting gravity.

6. The method of claim 3, wherein processing the motion sensor data characterizes horizontal motion by leveling accelerometer data using the determined orientation of the portable device.

7. The method of claim 2, wherein processing the motion sensor data further comprises determining magnitude for gyroscope data.

8. The method of claim 1, wherein deriving the use case characteristic comprises performing a statistical analysis.

9. The method of claim 1, wherein deriving the use case characteristic comprises determining an effective orientation component.

10. The method of claim 9, further comprising detecting peaks in the effective orientation component.

11. The method of claim 10, wherein detecting peaks comprises applying a threshold determined at least in part on a statistical analysis of the effective orientation component.

12. The method of claim 1, wherein deriving the use case characteristic comprises determining a radius of rotation value for the portable device.

13. The method of claim 1, wherein deriving the use case characteristic comprises detecting peaks in the motion sensor data.

14. The method of claim 13, wherein detecting peaks comprises applying a threshold determined at least in part on a statistical analysis of the motion sensor data.

15. The method of claim 13, wherein detecting peaks comprises determining peaks frequency.

16. The method of claim 13, wherein detecting peaks further comprises determining a range of the peaks frequency.

17. The method of claim 16, wherein detecting peaks further comprises determining a threshold for the range of the peaks frequency.

18. The method of claim 1, wherein deriving the use case characteristic comprises assigning an attribute to the motion sensor data.

19. The method of claim 18, wherein assigning the at least one attribute of the motion sensor data is based at least in part on the derived use case characteristic.

20. The method of claim 18, wherein assigning the at least one attribute of the motion sensor data comprises assigning a not dangling attribute.

21. The method of claim 18, wherein assigning the at least one attribute of the motion sensor data comprises assigning a dangling attribute.

22. The method of claim 18, wherein assigning the at least one attribute of the motion sensor data comprises assigning a pocket attribute.

23. The method of claim 18, wherein assigning the at least one attribute of the motion sensor data comprises assigning a radius of rotation attribute.

24. The method of claim 18, wherein assigning the at least one attribute of the motion sensor data comprises assigning a slow radius of rotation attribute.

25. The method of claim 18, wherein assigning the at least one attribute of the motion sensor data comprises assigning a general attribute.

26. The method of claim 18, wherein assigning the at least one attribute of the motion sensor data comprises assigning a belt attribute.

27. The method of claim 18, wherein assigning the at least one attribute of the motion sensor data comprises assigning an on ear attribute.

28. The method of claim 1, further comprising identifying unstable motion characteristics.

29. The method of claim 28, wherein categorizing the device use case of the portable device is based at least in part on assigning at least one attribute of the motion sensor data.

30. The method of claim 1, further comprising identifying normal motion characteristics.

31. The method of claim 30, wherein categorizing the device use case of the portable device is further based on at least one or a combination of the following:
   (i) a statistical analysis of the motion sensor data;
   (ii) a statistical analysis of an effective orientation component, wherein orientation is three dimensional and wherein the effective orientation component is a component of orientation that is more affected by the on foot motion of the user than other components of orientation;
   (iii) calculating a radius of rotation value;
   (iv) detecting peaks in the motion sensor data;
   (v) identifying a number of peaks in the motion sensor data and comparing it to a threshold;
   (vi) detecting a pattern of peaks in the motion sensor data; and
   (vii) calculating a range of peaks in the motion sensor data.

32. The method of claim 1, wherein categorizing the device use case of the portable device is based at least in part on detecting a characteristic pattern of peaks in the motion sensor data.

33. The method of claim 32, wherein categorizing the device use case of the portable device is further based on a range of peaks in the motion sensor data.

34. The method of claim 1, wherein categorizing the device use case of the portable device is based at least in part on assigning at least one attribute of the motion sensor data.

35. The method of claim 1, wherein categorizing the device use case of the portable device is based on an effective frequency in the motion sensor data.

36. The method of claim 35, wherein the effective frequency is determined using a frequency domain analysis.

37. The method of claim 36, wherein the frequency domain analysis includes a Fast Fourier Transformation (FFT).

38. The method of claim 35, wherein the effective frequency is determined using a time domain analysis.

39. The method of claim 35, wherein the effective frequency is determined using a time domain analysis and by calculating a signal power and a power ratio of the motion sensor data.

40. The method of claim 1, wherein categorizing the device use case of the portable device is further based on determination of an Eigen use case.

41. The method of claim 40, further comprising matching features extracted from the motion sensor data to at least one stored Eigen use case to determine the device use case.

42. The method of claim 41, wherein the at least one stored Eigen use case comprises a set of eigenvectors developed during a training phase.

43. The method of claim 1, further comprising deriving a navigation solution for the portable device based at least in part on the motion sensor data and the categorization of device use case.

44. A portable device for categorizing a device use case for the portable device comprising:
   a sensor assembly integrated with the portable device, configured to output data representing motion of the portable device, wherein the motion sensor data comprises measurements output by a motion sensor;
   a categorizer configured to perform at least one of the operations of:
      deriving a use case characteristic from the motion sensor data, wherein the use case characteristic relates to a type of interaction between the portable device and a user;
      determining an effective frequency from the motion sensor data; and
      determining an Eigen use case;
   wherein the categorizer determines a device use case for the portable device using the motion sensor data and at least one of the use case characteristic, the effective frequency and the Eigen use case, wherein the device use case comprises a type of interaction between the portable device and a user, and wherein categorizing the device use case of the portable device is based on at least two of the following:
   (i) a statistical analysis of an effective orientation component, wherein orientation is three dimensional and wherein the effective orientation component is a component of orientation that is more affected by the on foot motion of the user than other components of orientation;
   (ii) calculating a radius of rotation value;
   (iii) detecting a pattern of peaks in the motion sensor data; and
   (iv) calculating a range of peaks in the motion sensor data; and
   a processor configured to run the categorizer.

45. The portable device of claim 44, wherein the processor is further configured to process the motion sensor data.

46. The portable device of claim 44, further comprising a navigation module configured to provide a navigation solution for the portable device derived at least in part on the motion sensor data and the determined device use case.

47. The portable device of claim 44, wherein the sensor assembly includes an accelerometer and a gyroscope.

48. The portable device of claim 44, wherein the sensor assembly comprises an inertial sensor implemented as a Micro Electro Mechanical System (MEMS).

* * * * *